(12) United States Patent
Rentz

(10) Patent No.: US 12,453,844 B2
(45) Date of Patent: Oct. 28, 2025

(54) DEVICES AND METHODS FOR BILE DUCT SURGERY

(71) Applicant: JMT Medical, Inc., Billings, MT (US)

(72) Inventor: Jeffrey Justin Rentz, Billings, MT (US)

(73) Assignee: JMT Medical, Inc., Billings, MT (US)

( * ) Notice: Subject to any disclaimer, the term of this patent is extended or adjusted under 35 U.S.C. 154(b) by 0 days.

(21) Appl. No.: 18/892,020

(22) Filed: Sep. 20, 2024

(65) Prior Publication Data

US 2025/0235335 A1    Jul. 24, 2025

Related U.S. Application Data

(60) Provisional application No. 63/669,672, filed on Jul. 10, 2024, provisional application No. 63/584,788, filed on Sep. 22, 2023.

(51) Int. Cl.
*A61F 2/04* (2013.01)
*A61F 2/82* (2013.01)
(Continued)

(52) U.S. Cl.
CPC ............ *A61M 31/005* (2013.01); *A61F 2/04* (2013.01); *A61F 2/82* (2013.01); *A61F 2/962* (2013.01);
(Continued)

(58) Field of Classification Search
CPC ........ A61F 2/04; A61F 2/82; A61F 2002/041; A61F 2230/0091; A61F 2/06; A61F 2/86;
(Continued)

(56) References Cited

U.S. PATENT DOCUMENTS 4,306,566 A    12/1981  Sinko
4,699,611 A    10/1987  Bowden
(Continued)

FOREIGN PATENT DOCUMENTS

CA    2112589 C    11/1993
CA    2722709 A1   6/2011
(Continued)

OTHER PUBLICATIONS

Translation of KR 100305394 (Year: 2001).*
(Continued)

*Primary Examiner* — Brian E Pellegrino
(74) *Attorney, Agent, or Firm* — Martin Fessenmaier; Umberg Zipser LLP

(57) ABSTRACT

Devices, methods, and kits are presented that allow for simplified stent placement and stent retention in a biological vessel other than a blood vessel, and especially biliary stent placement in an antegrade manner. The devices and methods advantageously allow for shortened imaging and stent placement time, and substantially improve tolerability and/or retention of the stent in the vessel, and in further beneficial aspects, contemplated stents form a composite fluid path to facilitate drainage of the vessel. Still further, the devices and methods presented herein reduce or even entirely eliminate partial deflation of the peritoneal space during imaging and stent placement and so prevent exposure of operating personnel to vented gases carrying harmful agents.

14 Claims, 22 Drawing Sheets

(51) Int. Cl.
  *A61F 2/962* (2013.01)
  *A61M 31/00* (2006.01)
  *A61M 39/02* (2006.01)
  *A61M 25/09* (2006.01)

(52) U.S. Cl.
  CPC ... *A61M 39/0247* (2013.01); *A61F 2002/041* (2013.01); *A61F 2230/0069* (2013.01); *A61F 2230/0091* (2013.01); *A61F 2250/0067* (2013.01); *A61M 2025/09183* (2013.01); *A61M 2039/0255* (2013.01)

(58) Field of Classification Search
  CPC ............... A61F 2210/0014; A61F 2/88; A61F 2250/0067; A61L 31/14
  USPC ............................................ 604/8; 623/1.18
  See application file for complete search history.

(56) References Cited

U.S. PATENT DOCUMENTS

| | | | |
|---|---|---|---|
| 5,147,334 | A | 9/1992 | Moss |
| 5,236,417 | A | 8/1993 | Wallis |
| 5,334,143 | A | 8/1994 | Carroll |
| 5,374,273 | A | 12/1994 | Nakao et al. |
| 5,397,302 | A | 3/1995 | Weaver et al. |
| 5,599,300 | A | 2/1997 | Weaver et al. |
| 5,776,160 | A | 7/1998 | Pasricha et al. |
| 5,800,411 | A | 9/1998 | Nakada et al. |
| 5,876,450 | A | 3/1999 | Johlin, Jr. |
| 6,132,471 | A | 10/2000 | Johlin, Jr. |
| 6,645,239 | B1 | 11/2003 | Park et al. |
| 6,656,212 | B2 | 12/2003 | Ravenscroft et al. |
| 6,770,066 | B1 | 8/2004 | Weaver et al. |
| 7,285,130 | B2 | 10/2007 | Austin |
| 7,645,254 | B2 | 1/2010 | Rowland et al. |
| 7,722,663 | B1 | 5/2010 | Austin |
| 7,875,068 | B2 | 1/2011 | Mangiardi et al. |
| 7,909,797 | B2 | 3/2011 | Kennedy, II et al. |
| 7,947,016 | B2 | 5/2011 | Lentz |
| 7,955,370 | B2 | 6/2011 | Gunderson |
| 7,967,770 | B2 | 6/2011 | Li et al. |
| 7,976,460 | B2 | 7/2011 | Richardson |
| 8,029,473 | B2 | 10/2011 | Carter et al. |
| 8,029,555 | B2 | 10/2011 | Howell et al. |
| 8,292,872 | B2 | 10/2012 | Soetermans |
| 8,435,284 | B2 | 5/2013 | Eidenschink et al. |
| 8,491,647 | B2 | 7/2013 | Colgan et al. |
| 8,585,753 | B2 | 11/2013 | Scanlon et al. |
| 8,603,185 | B2 | 12/2013 | Shah et al. |
| 9,226,812 | B2 | 1/2016 | Anai et al. |
| 9,326,783 | B2 | 5/2016 | Dusbabek et al. |
| 9,486,219 | B2 | 11/2016 | Van Dam et al. |
| 9,744,025 | B2 | 8/2017 | Sato |
| 9,889,027 | B2 | 2/2018 | Campbell et al. |
| 9,901,347 | B2 | 2/2018 | Van Dam et al. |
| 9,907,456 | B2 | 3/2018 | Miyoshi |
| 10,357,387 | B2 | 7/2019 | Walsh et al. |
| 10,406,007 | B2 | 9/2019 | Walsh et al. |
| 11,202,672 | B2 | 12/2021 | Habib |
| 11,213,348 | B2 | 1/2022 | Kachaamy |
| 11,389,171 | B2 | 7/2022 | Goldsmith |
| 2004/0193262 | A1* | 9/2004 | Shadduck ............ A61F 9/00781 977/944 |
| 2005/0004512 | A1 | 1/2005 | Campbell et al. |
| 2005/0049608 | A1 | 3/2005 | Aznoian et al. |
| 2005/0070821 | A1 | 3/2005 | Deal et al. |
| 2006/0235269 | A1 | 10/2006 | Waxman |
| 2006/0282155 | A1 | 12/2006 | Fearn et al. |
| 2008/0051911 | A1 | 2/2008 | Rucker |
| 2008/0249457 | A1 | 10/2008 | Li et al. |
| 2009/0005754 | A1 | 1/2009 | Soetermans |
| 2009/0048654 | A1 | 2/2009 | Chmura et al. |
| 2009/0281498 | A1 | 11/2009 | Acosta et al. |
| 2010/0004599 | A1 | 1/2010 | Zhou et al. |
| 2010/0256731 | A1* | 10/2010 | Mangiardi ............ A61F 2/844 623/1.36 |
| 2011/0152788 | A1 | 6/2011 | Hotter |
| 2011/0224775 | A1 | 9/2011 | Shah et al. |
| 2011/0282353 | A1 | 11/2011 | Mchugo |
| 2012/0083661 | A1 | 4/2012 | Rockrohr |
| 2012/0143134 | A1 | 6/2012 | Hollis et al. |
| 2013/0211246 | A1 | 8/2013 | Parasher |
| 2014/0024993 | A1 | 1/2014 | Sato |
| 2014/0025180 | A1 | 1/2014 | Gupta |
| 2014/0142542 | A1 | 5/2014 | Rosenbaum et al. |
| 2015/0011834 | A1 | 1/2015 | Ayala et al. |
| 2015/0073391 | A1 | 3/2015 | Hutchins et al. |
| 2015/0150572 | A1 | 6/2015 | Kumbhari et al. |
| 2015/0250579 | A1 | 9/2015 | Howard et al. |
| 2017/0080193 | A1 | 3/2017 | Kamada |
| 2019/0184136 | A1 | 6/2019 | Lubinski et al. |
| 2019/0366059 | A1 | 12/2019 | Raijman et al. |
| 2020/0046536 | A1 | 2/2020 | Yu |
| 2020/0178767 | A1 | 6/2020 | Miller |
| 2021/0177631 | A1 | 6/2021 | Mamiya |
| 2021/0196444 | A1 | 7/2021 | Naveh et al. |
| 2021/0259728 | A1 | 8/2021 | Thomas et al. |
| 2021/0259861 | A1 | 8/2021 | Itoi et al. |
| 2021/0338467 | A1 | 11/2021 | McWeeney et al. |
| 2021/0393425 | A1 | 12/2021 | Fuseya et al. |
| 2022/0104933 | A1 | 4/2022 | Binmoeller et al. |
| 2022/0176089 | A1 | 6/2022 | Isayama |
| 2022/0241555 | A1 | 8/2022 | Ghosheh et al. |
| 2022/0313462 | A1 | 10/2022 | Gon |
| 2023/0000487 | A1 | 1/2023 | Clay et al. |
| 2023/0079321 | A1 | 3/2023 | Raijman et al. |
| 2023/0233312 | A1 | 7/2023 | Desai et al. |
| 2023/0233313 | A1 | 7/2023 | Desai et al. |
| 2023/0285048 | A1 | 9/2023 | Atto et al. |
| 2023/0301493 | A1 | 9/2023 | Bogusky et al. |
| 2023/0338702 | A1 | 10/2023 | Tilson et al. |
| 2023/0414388 | A1 | 12/2023 | Jackson et al. |
| 2024/0024138 | A1 | 1/2024 | Naveh et al. |
| 2024/0024141 | A1 | 1/2024 | Morris et al. |
| 2024/0058024 | A1 | 2/2024 | Fayyaz |
| 2024/0065717 | A1 | 2/2024 | Crawford et al. |
| 2024/0075256 | A1 | 3/2024 | Neff et al. |
| 2024/0081971 | A1 | 3/2024 | Folan |
| 2024/0261541 | A1 | 8/2024 | Nalawade et al. |

FOREIGN PATENT DOCUMENTS

| | | | | |
|---|---|---|---|---|
| EP | 1791494 | B1 | 6/2007 | |
| EP | 1861040 | B1 | 12/2007 | |
| EP | 1942975 | A1 | 7/2008 | |
| EP | 2353552 | A1 | 8/2011 | |
| EP | 2489334 | B1 | 8/2012 | |
| EP | 2874567 | B1 | 5/2015 | |
| EP | 3585318 | A1 | 1/2020 | |
| EP | 3756628 | A1 | 12/2020 | |
| EP | 3811899 | B1 | 4/2021 | |
| GB | 2268067 | B | 1/1994 | |
| KR | 100305394 | B1 * | 11/2001 | ............... A61F 2/04 |
| KR | 20160037487 | A | 4/2016 | |
| KR | 1020160037487 | A | 4/2016 | |
| KR | 102572072 | B1 | 8/2023 | |
| WO | WO-9626682 | A1 * | 9/1996 | ............... A61F 2/01 |
| WO | WO-2004004602 | A1 * | 1/2004 | ............... A61F 2/86 |
| WO | 2008030256 | A1 | 3/2008 | |
| WO | 2015179561 | A1 | 11/2015 | |
| WO | WO-2018156613 | A1 * | 8/2018 | ............. A61L 31/16 |
| WO | 2023029156 | A1 | 3/2023 | |

OTHER PUBLICATIONS

Fanelli Deployment (Package Label); Cook Medical Inc.; 24 Pages.
Robert D. Fanelli, M.D., F.A.C.S., Keith S. Gersin, M.D., Journal of Gastrointestinal Surgery, Laparoscopic Endobiliary Stenting; 7 Pages.

(56) References Cited

OTHER PUBLICATIONS

Robert D. Fanelli, M.D., F.A.C.S., Keith S. Gersin, M.D., Journal of Gastrointestinal Surgery, Laparoscopic Endobiliary Stenting; Mar. 1992; 4 Pages.
Science of Plastics—Science History Institute (Year 2023).

\* cited by examiner

DEVICES AND METHODS FOR BILE DUCT SURGERY

This application claims priority to our U.S. Provisional patent applications with the Ser. No. 63/584,788, filed Sep. 22, 2023, and 63/669,672, filed Jul. 10, 2024, both of which are incorporated by reference in their entirety herein.

FIELD OF THE INVENTION

The field of the invention is devices, kits, and methods related to surgery, and especially as it relates to bile duct imaging, bile duct stenting, and associated surgical procedures in which a bile duct stent is placed in an antegrade manner.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The number of gallbladder surgeries has been steadily increasing in the United States and worldwide since 1990. Most recent data report 1.2 million cases per year in the United States, and 26.4 million cases in 1990 and 52 million cases worldwide in 2019. Nearly 40% of gallbladder surgery includes a procedure to evaluate the bile ducts for abnormal anatomy or gallstones. This procedure is also known as a cholangiogram and requires in most cases two medical professionals at the operating table to introduce the catheter into the cystic duct, which is the tubular structure between the gallbladder and the common bile duct (CBD). Radiopaque contrast dye is injected, and fluoroscopic imaging is used to see the passage of contrast from the liver into the duodenum. Gallstones in the biliary tree are radiolucent on imaging. Among other complicating factors, there are valves (spiral valves of Heister) within the cystic duct that can render placement of a catheter difficult.

If stones are found, then the two most common current options for management include a common bile duct exploration, which requires specialist intervention that may not be available at all treatment centers (and which is typically laparoscopically or percutaneously performed adding operative time and potential complications), or electing to secure the cystic duct, complete the operation, and refer the patient for an emergent Endoscopic Retrograde Cholangio-Pancreatography (ERCP) and stone extraction by a specialist in GI medicine or Surgical Endoscopist. The reported success rate of ERCP cannulation of the bile duct is 83-95% and the reported complication rate is 10-13%. Cannulation may be difficult due to anatomic variants. The most common immediate complications are pancreatitis, bleeding, and duodenal injuries from the sphincterotomy performed to permit access to the common bile duct as these processes are performed in a retrograde manner. Additionally, there are also delayed complications of stricture or bile dumping. In addition, access to care is often limited and there is still a significant shortage of ERCP-trained endoscopists. Indeed, many hospitals do not have such endoscopist on staff, and their patients must be transferred to other facilities either before or after surgery for care. Numerous studies have described higher complication rates for emergent procedures of all types as well.

If the operative team and the necessary equipment and skills are available, then a Common Bile Duct Exploration (CBDE) could alternatively be performed to clear the bile duct of stones. However, and as noted above, such procedure requires significantly more expensive equipment, set up of the equipment is cumbersome and time consuming, and success rates vary greatly. In addition to being expensive, the equipment is often fickle to operate and visualization if often limited. Consequently, only a slim minority of practices routinely perform CBDE when stones are found.

In an effort to avoid at least some of the above difficulties associated, access to the bile duct can be percutaneous and stent placement can be performed in an antegrade manner using laparoscopic techniques (see *J Gastrointest Surg.* 2001 January-February; 5(1): 74-80 and *Surg Endosc* (1998) 12:301-304). Unfortunately, while such process allows visualization of at least some of the biliary tree and placement of the stent in a single antegrade procedure, various difficulties nevertheless remain. Among other issues, such process typically requires multiple tools and access points, and places a relatively short and linear stent across the ampulla of Vater, which is difficult to place and can readily dislodge after placement, and which generates only a minimal flow path for bile and pancreatic juice, particularly where stones are still present.

In an effort to prevent dislodging of the stent, U.S. Pat. No. 7,967,770 describes a biliary stent having a curvilinear portion where the stent is placed from a duodenoscope over a wire in a retrograde manner. Here, the stent is placed within the common bile duct, but not placed and retained within the Sphincter of Oddi and Papilla of Vater and does not extend into the duodenum. As such, the curved distal portion is adapted to retain the tubular member within the biliary duct using minimal contact with the bile duct and prevents migration of the tubular member into the duodenum. Upon placement into the obstructed bile duct, the lumen of the stent will then form a drainage conduit that allows flow of bile through across the obstructed portion. While providing at least some benefits with regard to stent retention, such stent requires retrograde placement and is typically not performed with cholangiography in a concurrent manner, necessitating multiple interventions.

Thus, even though various devices and methods of bile duct surgery are known in the art, all or almost all of them suffer from several drawbacks, particularly where it is desired to place an intraoperative stent. Therefore, there remains a need for improved devices and methods of bile duct surgery.

SUMMARY OF THE INVENTION

The inventive subject matter is directed to various devices, methods, and kits for significantly simplified stent placement, and especially biliary stent placement in an antegrade manner that allows for significantly shortened imaging and stent placement time, that improves tolerability and/or retention of the stent while forming a composite fluid path, and that reduces or entirely eliminates partial deflation of the peritoneal space.

In one aspect of the inventive subject matter, the inventor contemplates a biliary stent that comprises a tubular body having a proximal portion with a proximal end and a distal portion with a distal end. The tubular body is deformable between a tensioned linear delivery configuration and an expanded helical deployment configuration, and the tubular body comprises a polymeric material having a Young's modulus that is effective to (a) exert a frictional force on an antegrade delivery device in the tensioned linear delivery configuration to so retain the tubular body on the delivery device; and (b) exert a radially expansive force on an inner wall of a bile duct in the expanded helical deployment configuration to radially expand the inner wall of the bile duct so retain the tubular body in the bile duct. Such stent will further include a plurality of fenestrations in the tubular body. As desired, the number of fenestrations in the distal portion may be higher than the number of fenestrations in the proximal portion.

Most typically, but not necessarily, the distal portion may further include a non-helical portion, typically with a length to allow placement of the non-helical portion through the hepatopancreatic ampulla of Vater into the duodenum of a subject. In particularly contemplated embodiments, the stent exerts the radially expansive force over a cumulative length of at least a quarter, or at least half, or at least three quarter of the overall length of the stent. Therefore, in at least some embodiments, the stent is configured to radially expand the inner wall of the bile duct, for example by at least 2% and by no more than 8%.

With regard to selected mechanical properties it is contemplated that the ratio of the Young's modulus of the polymeric material to the Young's modulus of the bile duct for radial expansion may be between 1.2:1 and 1.9:1. Viewed from a different perspective, it is contemplated that the ratio of the Young's modulus of the polymeric material to the Young's modulus of the bile duct for radial expansion is selected such that, upon deployment of the stent, the inner wall diameter of the bile duct is increased by between 3% and 10%. For example, the Young's modulus of the polymeric material is between 4.0 MPa and 1.2 MPa Additionally, or alternatively, it should be appreciated that the ratio of the spring constant for radial expansion of the biliary stent and the spring constant for radial expansion of the bile duct may be between 3:1 and 10:1. For example, the spring constant for radial expansion of the biliary stent may be between 1,000 N/m and 10,000 N/m, and/or wherein the spring constant for radial expansion of the bile duct may be between 15,000 N/m and 30,000 N/m.

It should further be appreciated that the stents contemplated herein need not comprise one or more retention elements such as a barb or flap extending away from the tubular body. Where desired, the stents presented herein may comprise a color marker and a radiopaque marker on the proximal end, and further comprise a radiopaque marker on the distal end and proximal end. In additional embodiments, it is contemplated that the stent may have an outer diameter that is hermetically matched to a pneumotrocar through which the stent is deployed, and/or that the stent may have an outer diameter that is the same as an outer diameter of the antegrade delivery device. For example, suitable dimensions include stents with an outer diameter between 2 mm (6 French) and 3.33 mm (10 French), such as an outer diameter of 2.67 mm (8 French). Most typically, contemplated biliary stents may have a length of between 9 cm and 13 cm in the linear delivery configuration (e.g., at least 10 cm in the linear delivery configuration).

In still further contemplated embodiments, the stent will form in the helical deployment configuration a helix with an inner open diameter of between 3 mm and 5 mm, and/or that the length difference between the linear delivery configuration and the helical deployment configuration may be between 7% and 12%. Preferably, but not necessarily, contemplated stents may have at least 1.5, or at least 1.8, or at least 2.0, or at least 2.3 helical turns. Therefore, contemplated stents will form in the helical deployment configuration a composite fluid path comprising an intrahelical fluid path and an intratubular fluid path. With regard to suitable materials, contemplated polymeric materials will comprise LDPE (low density polyethylene). Additionally, it should be appreciated that the polymeric material further comprises a pharmaceutical agent such as an antimicrobial agent, a chemotherapeutic agent, an anti-inflammatory agent, an immune modulatory agent, and/or a radioactive agent.

In another aspect of the inventive subject matter, the inventor also contemplates a stent that comprises a polymeric tubular body having a helical portion that is configured to helically engage with and radially extend a biological vessel into which the stent is placed, wherein the biological vessel is not a blood vessel. The polymeric material of the helical portion in such stents may have a Young's modulus that is matched to a Young's modulus for radial expansion of the biological vessel such that radial expansion of the biological vessel by the helical portion is in an amount of between 2% and 20%. Moreover, the Young's modulus of the polymeric material of the helical portion will also allow for elastic deformation of the helical portion into a linear delivery configuration.

In some embodiments of such stents, the ratio of the Young's modulus of the polymeric material of the helical portion to the Young's modulus of the biological vessel for radial expansion may be between 1.2:1 and 1.9:1. For example, the Young's modulus of the polymeric material of the helical portion may be between 4.0 MPa and 1.2 MPa. As noted above, the polymeric tubular body may further comprise a plurality of fenestrations, and optionally comprise a non-helical portion. Thus, contemplated stents may form, upon insertion into the biological vessel, a composite fluid path comprising an intrahelical fluid path and an intratubular fluid path. It is further contemplated that the helical portion, without placement into the biological vessel, has a helical outer diameter that is larger than an inner diameter of the biological vessel. Most typically, the biological vessel will be a cystic bile duct, a common bile duct, a hepatic duct, a pancreatic duct, or a ureter, and it is generally contemplated that the stent has at least 1.5 helical turns.

In a further aspect of the inventive subject matter, the inventor contemplates a stent that comprises a polymeric tubular body having a helical portion that is configured to helically engage with and radially extend a biological vessel into which the stent is placed, wherein the biological vessel is not a blood vessel. The helical portion in such stents will have a spring constant that is matched to a spring constant for radial expansion of the biological vessel such that radial expansion of the biological vessel by the helical portion is in an amount of between 2% and 20%. Moreover, the spring constant of the helical portion will also allow for elastic deformation of the helical portion into a linear delivery configuration. For example, the ratio of the spring constant for radial expansion of the helical portion and the spring constant for radial expansion of the biological vessel may be between 3:1 and 10:1. Therefore, the spring constant of the helical portion may be between 1,000 N/m and 10,000 N/m, and/or the spring constant for radial expansion of the biological vessel may be between 15,000 N/m and 30,000 N/m. In typical embodiments, the stent will have at least 1.5 helical turns.

It is generally contemplated that the polymeric tubular body such stents may further comprise a plurality of fenestrations, and optionally comprise a non-helical portion. Therefore, such stents will form stent, upon insertion into the biological vessel, a composite fluid path that comprises an intrahelical fluid path and an intratubular fluid path. Typically, the helical portion will have, before placement into the biological vessel, a helical outer diameter that is larger than an inner diameter of the biological vessel. Exemplary biological vessels include the cystic bile duct, the common bile duct, the hepatic duct, the pancreatic duct, and the ureter. However, in at least some embodiments, contemplated biological vessels will not be blood vessels.

In yet another aspect of the inventive subject matter, the inventor contemplates a method of bile duct imaging and antegrade stenting that includes the steps of (a) placing a pneumotrocar through an incision across an abdominal wall of a subject, wherein the pneumotrocar comprises a proximal portion having a septum that preserves insufflation within an abdominal space in the subject; (b) advancing a cholangiocatheter through the septum and the pneumotrocar until a distal portion of the cholangiocatheter has entered a duct in a biliary tree; (c) feeding a contrast dye through the cholangiocatheter into the duct to thereby allow imaging of at least a portion of a biliary tree; (d) upon imaging, feeding a guide wire through the cholangiocatheter until a distal portion of the guide wire has entered a duodenum of the subject, then removing the cholangiocatheter from the pneumotrocar; (e) advancing a stent delivery device through the septum and over the guide wire, wherein the stent delivery device has an inner canula, an outer cannula, and a stent in a tensioned linear delivery configuration; and (f) placing the stent into the subject such that one portion of the stent extends into the duodenum and another portion of the stent remains in a common bile duct. In such methods, upon placing the stent, the stent elastically converts into an expanded helical deployment configuration and thereby radially expands an inner wall of the duct to so retain the stent in the duct facilitate flow of bile through the duct.

Preferably, but not necessarily, the pneumotrocar will have an inner diameter that is configured to form a hermetic barrier with an outside surface at least one or the cholangiocatheter, the stent delivery device, and the stent. It is also preferred that the pneumotrocar is a bladeless pneumotrocar and/or that the septum of the pneumotrocar comprises a pierceable portion and/or a flexible one-way valve.

With respect to the cholangiocatheter it is contemplated that the cholangiocatheter may have a flexible distal tip, and that a radiopaque marker may be located proximal to a flexible distal tip. In additional embodiments, the cholangiocatheter has a proximal end that comprises two separate fluid injection ports and a multi-port adapter allowing multiple inputs (e.g., Tuohy Borst adapter). Furthermore, it is generally preferred that the cholangiocatheter and the multi-port adaptor are configured to allow passage of a guide wire (e.g., having a flexible tip) through the cholangiocatheter into the duodenum. As will be readily appreciated, the duct in the biliary tree may be a cystic duct.

With respect to the stent delivery device it is contemplated that the device may have an inner cannula nested inside an outer cannula, and that the stent is slidably coupled to and over a portion of the inner cannula extending from the outer cannula. Moreover, it is typically preferred that the stent in the tensioned linear delivery configuration exerts sufficient frictional force against the inner cannula to so retain the stent coupled to the inner cannula (and as such avoid the need for a protective sheath). As noted earlier, it is also contemplated that the stent in the expanded helical deployment configuration exerts a radially expansive force against the inner wall of the duct to so radially expand the duct, for example, in in an amount of between 2% and 20%. Moreover, it is generally preferred that the stent will have a plurality of fenestrations, and that the stent forms, upon insertion into the duct, a composite fluid path comprising an intrahelical fluid path and an intratubular fluid path. Furthermore, it is contemplated that the stent will have at least 1.5 helical turns, and/or that a portion of the stent that extends into the duodenum comprises a non-helical portion.

Additionally, it should be recognized that in addition to cholangiography and stet placement, contemplated methods using the devices described herein may further include (a) a step of advancing a cystic duct dilation balloon catheter through the septum and over the guide wire, and using the cystic duct dilation balloon catheter to dilate the cystic duct; (b) a step of advancing a stone removal balloon catheter through the septum and over the guide wire, and using the stone removal balloon catheter to remove stones from the cystic duct or common bile duct; and/or (c) a step of coupling a contrast dye delivery device to the outer cannula, and delivering contrast dye to the duct to so perform a completion cholangiogram. Furthermore, it should be appreciated that the devices and methods described herein may be used in a laparoscopic procedure or with robotic surgical assistance.

In view of the above, and in a still further aspect of the inventive subject matter, the inventor contemplates a bladeless pneumotrocar that includes a tubular body having a proximal fluted portion and a distal portion, wherein the tubular body forms a conduit. A septum is coupled to the proximal fluted portion and hermetically seals the conduit, wherein the septum (e.g., manufactured from a silicone polymer) comprises a pierceable portion and/or a flexible one-way valve, and wherein the conduit has an inner diameter that is configured to form a hermetic barrier with an outside surface of a cholangiocatheter, a delivery device of a stent, and/or a stent that is coupled to the delivery device.

Preferably, the septum is removably coupled to the fluted portion via a groove in the fluted portion and a ridge in the septum portion. In addition, the septum may be retained on the fluted portion via the groove and the ridge and via an elastic deformation force by a portion of the septum that extends over an outside of the fluted portion. Therefore, it is also contemplated that the septum may be configured as a cap that matingly extends over at least a portion of an outside surface of the fluted portion. In further contemplated embodiments, a removable bladeless stylus is included in the pneumotrocar and has an extended portion that is slidably disposed in the conduit. Preferably, the removable bladeless stylus will have an elongated handle portion. For example, the pneumotrocar with the stylus may have an overall length of between 15 cm and 20 cm as measured from an end of the distal portion to an end of the handle portion, and/or the tubular body may have a length of between about 10 and 15 cm, and the conduit may have an inner diameter of between 2 mm (6 French) and 3.33 mm (10 French).

In still another aspect of the inventive subject matter, the inventor contemplates a kit for cholangiography that includes a polymeric container comprising a top compartment and a bottom compartment, and a separating layer between the top and bottom layers. The top layer in such container may contain a pneumotrocar as presented herein, and the bottom may contain a cholangiocatheter and a plurality of syringes, wherein the cholangiocatheter has a proximal end that comprises two separate fluid injection ports and a multi-port adapter allowing multiple inputs.

Most typically, but not necessarily, the pneumotrocar will have an inner diameter that is configured to form a hermetic barrier with an outside surface the cholangiocatheter. Respective adhesive labels for attachment to the syringes may be included. Furthermore, it is contemplated that the cholangiocatheter will have a flexible tip, and/or a radiopaque marker, and that the multi-port adapter is a Tuohy-Borst adapter.

Additionally, the inventor contemplates a kit for cystic duct dilation that includes a cystic duct balloon dilation catheter comprising an inflatable balloon portion, wherein the cystic duct balloon dilation catheter further comprises a channel that is configured to receive a guide wire. Preferably, the cystic duct balloon dilation catheter has a multi-port adapter allowing multiple inputs on one end of the channel, and the cystic duct balloon dilation catheter has an outside surface that is configured to form a hermetic barrier with an inner surface of a pneumotrocar. Also included in the kit are a guide wire and a syringe having a volume suitable for inflation of the inflatable balloon portion.

Furthermore, the inventor contemplates a kit for stone removal that includes a stone removal balloon catheter comprising an inflatable balloon portion, wherein the stone removal balloon catheter further comprises a channel that is configured to receive a guide wire. Preferably, the stone removal balloon catheter has a multi-port adapter allowing multiple inputs on one end of the channel, and the stone removal balloon catheter has an outside surface that is configured to form a hermetic barrier with an inner surface of a pneumotrocar. Also included in the kit are a guide wire and a syringe having a volume suitable for inflation of the inflatable balloon portion.

Finally, the inventor contemplates a kit for stent placement that includes a stent delivery device comprising an inner cannula, an outer cannula, wherein the inner cannula is configured to extend beyond the outer cannula and further configured to slidingly receive and retain a stent as described herein. Also included in the kit are a guide wire and a contrast dye adaptor that is configured to fluidly couple a contrast dye delivery device to a proximal end of the outer cannula. Most typically, but not necessarily, the stent delivery device and/or the stent will have an outer surface that is configured to form a hermetic barrier with an inside surface of a pneumotrocar.

Various objects, features, aspects and advantages of the inventive subject matter will become more apparent from the following detailed description of preferred embodiments, along with the accompanying drawing figures in which like numerals represent like components.

DETAILED DESCRIPTION

The inventor has discovered various devices and methods for bile duct imaging and surgery, and particularly for imaging and stent placement in a single produce in an antegrade manner that avoids emergent ERCP where stones are found. Indeed, so treated patients can now safely schedule follow-up procedures at a different location within days and even weeks after stent placement.

Moreover, due to the simplified devices and procedures presented herein, operative time and risks are substantially reduced while providing the surgeon with the opportunity to implement additional steps in the same procedure such as cystic duct dilation and/or stone removal as desired. Advantageously, and as described in more detail below, the procedure can be performed percutaneously using laparoscopic techniques or can be performed with robotic assistance (e.g., using a da Vinci robotic system from Intuitive Surgical). Indeed, as all steps after imaging can be performed over-the-wire, precision and speed of the intervention is greatly enhanced. Moreover, owing to its unique configuration, the stent can be accurately placed and reliably maintained in situ while at the same time allowing for simple endoscopic removal from the duodenum in a later procedure. Still further, it should be appreciated that the devices and methods suitable for use herein can take advantage of a single pneumotrocar through which all tools can be advanced in a hermetically sealed manner that not only prevents loss of insufflation but also reduces, or even entirely eliminates, exposure of the surgical team to noxious fumes and aerosols.

Figure 1:
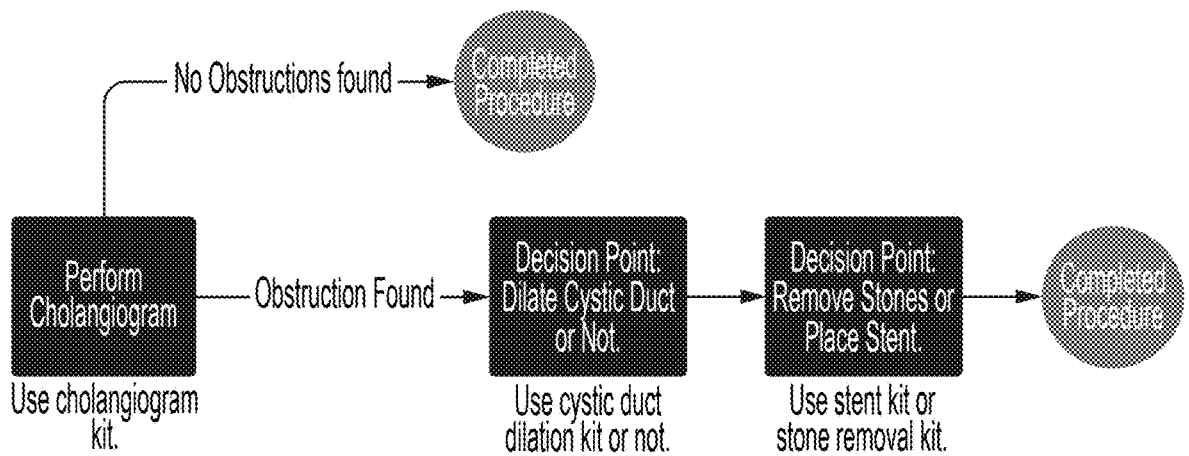
FIG. 1 is a schematic illustration depicting an exemplary workflow and associated decision points for use with the devices and methods presented herein.

FIG. 1 depicts an exemplary workflow and associated decision points that can be performed using the kits, devices, and methods presented herein. As will be readily apparent, using such devices and methods affords maximum flexibility throughout the operative process while maintaining simplicity of tools and steps. Here, a cholangiogram kit can be used to percutaneously access the cystic bile duct and to visualize at least a portion of the biliary tree, such as the cystic bile duct and the common bile duct (and in most cases also the common hepatic bile duct and part of the pancreatic duct). Where obstructions are found during imaging, the physician will now have the opportunity to perform a cystic duct dilation as needed and/or to remove at least some of the stones found in the common bile duct using the bile duct dilation kit and/or the stone removal kit. As a further option, the physician can then also place a biliary stent to stabilize the patient and to allow the patient to return for follow-up treatment (most typically ERCP) within several days or even weeks. As will be readily appreciated, such process will advantageously alleviate the need for specialty surgeons or endoscopists on site and allow a patient to select a treatment center of their choice.

Figure 2A:
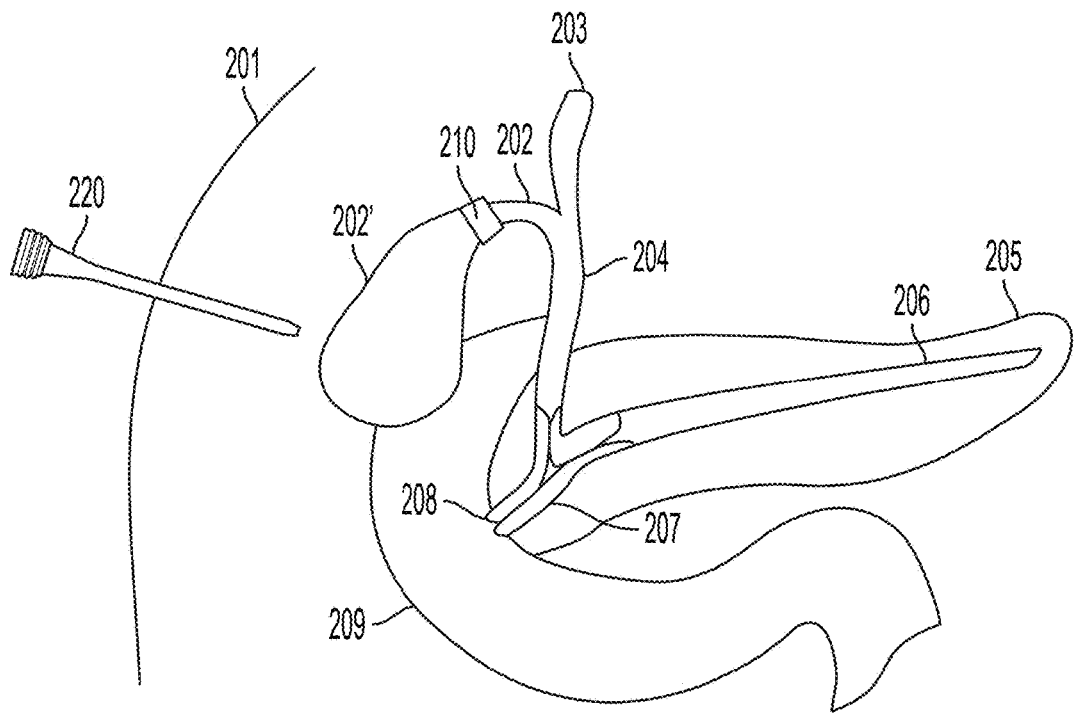
FIGS. 2A-2P are schematic illustrations of process steps for an exemplary procedure in which cholangiography, cystic duct dilation, stone removal, and stent placement are performed in a single intervention and in which these steps are performed through a single pneumotrocar.
Figure 2B:
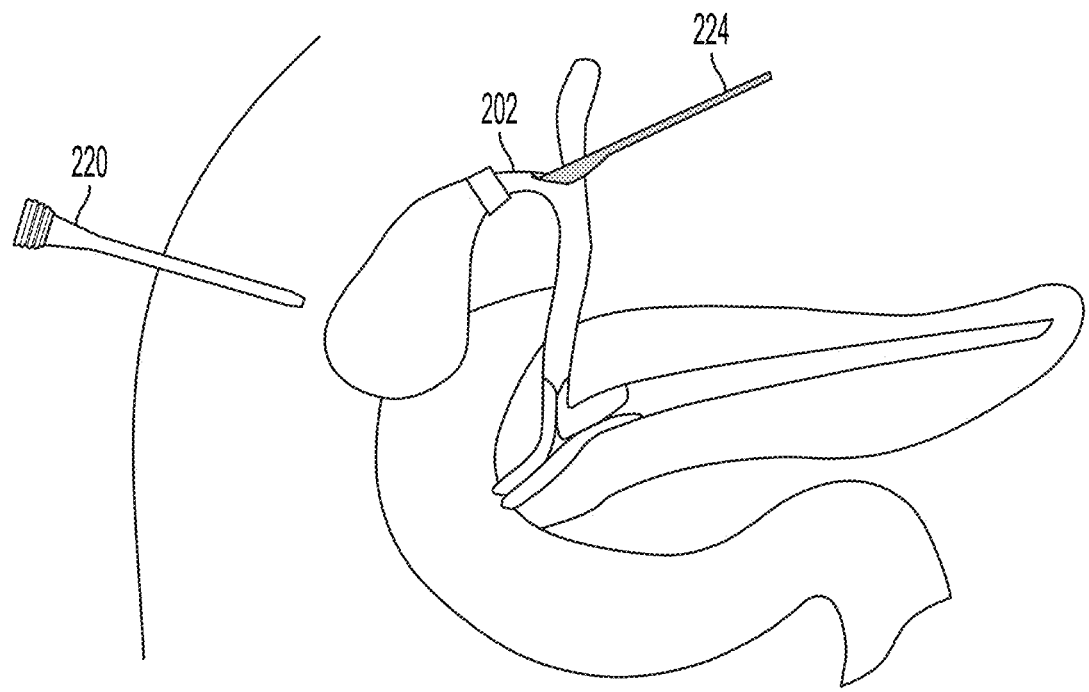
Figure 2C:
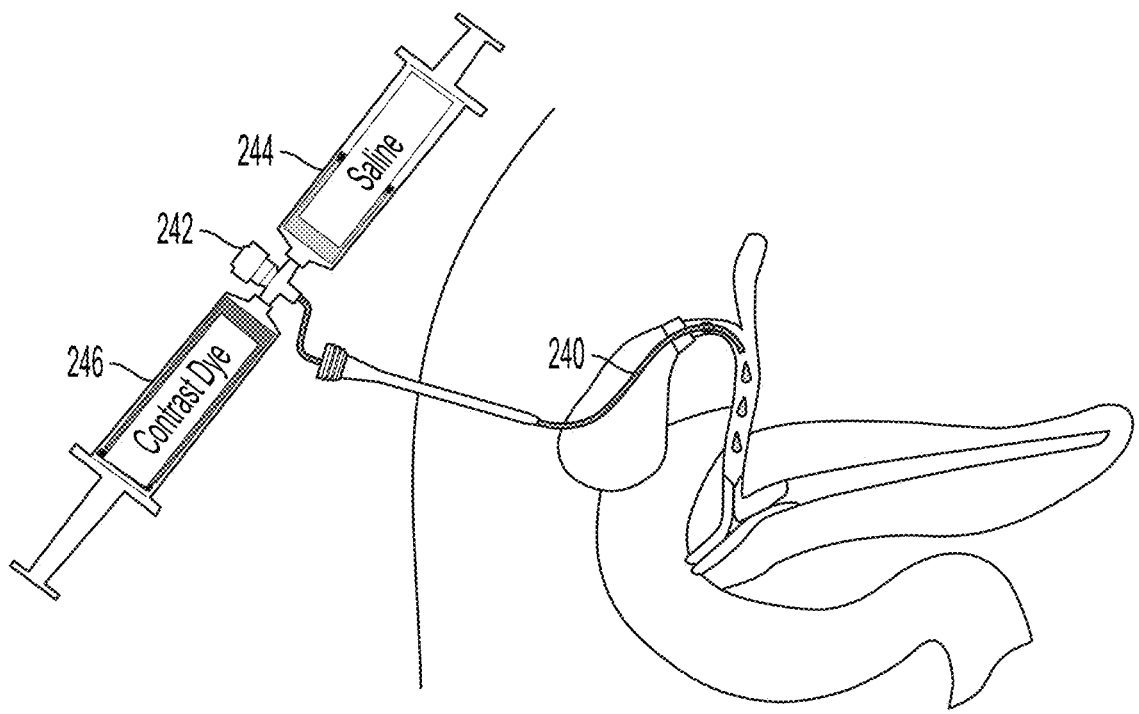
Figure 2D:
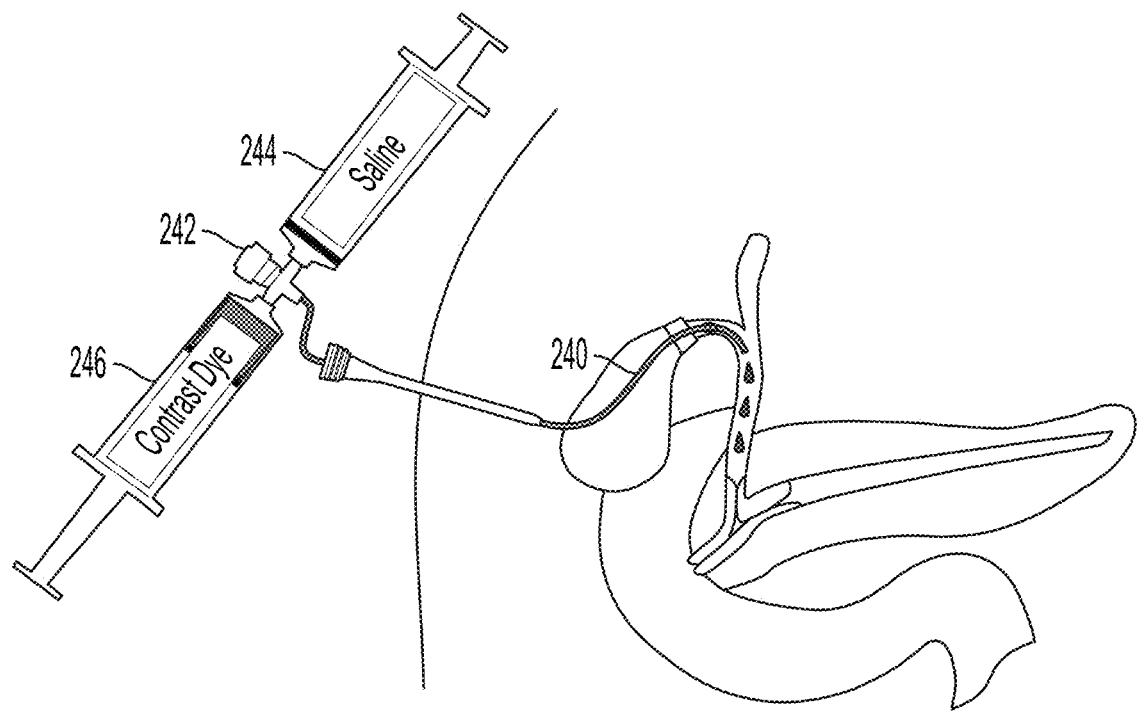
Figure 2E:
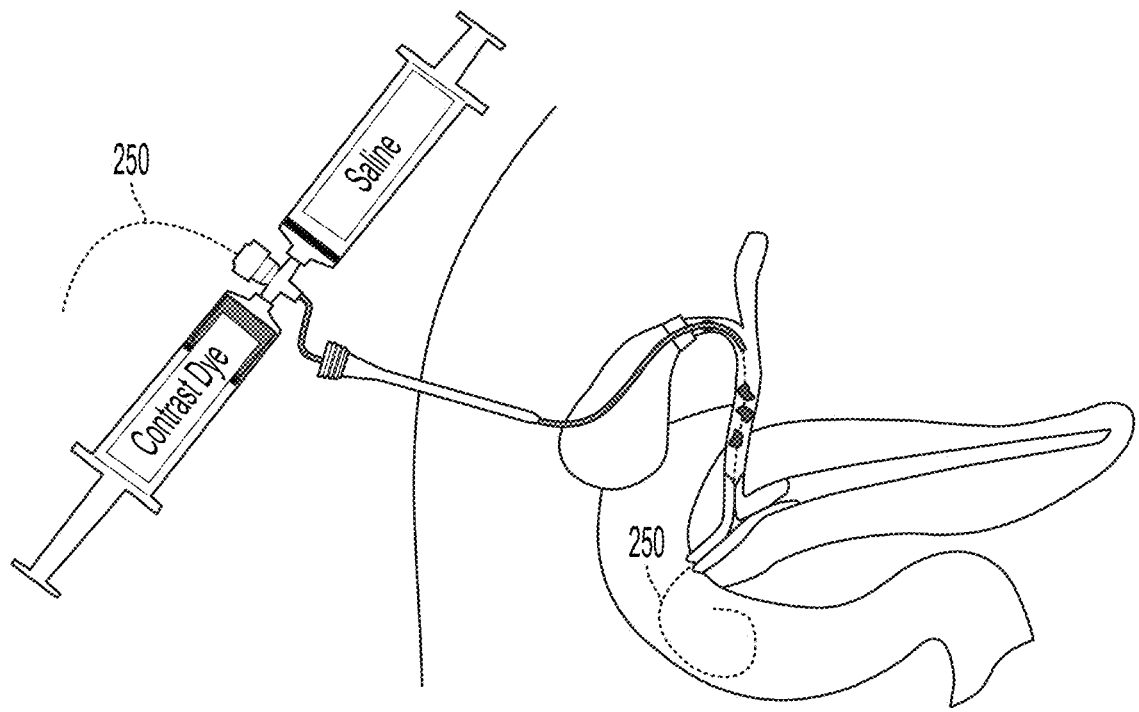
Figure 2F:
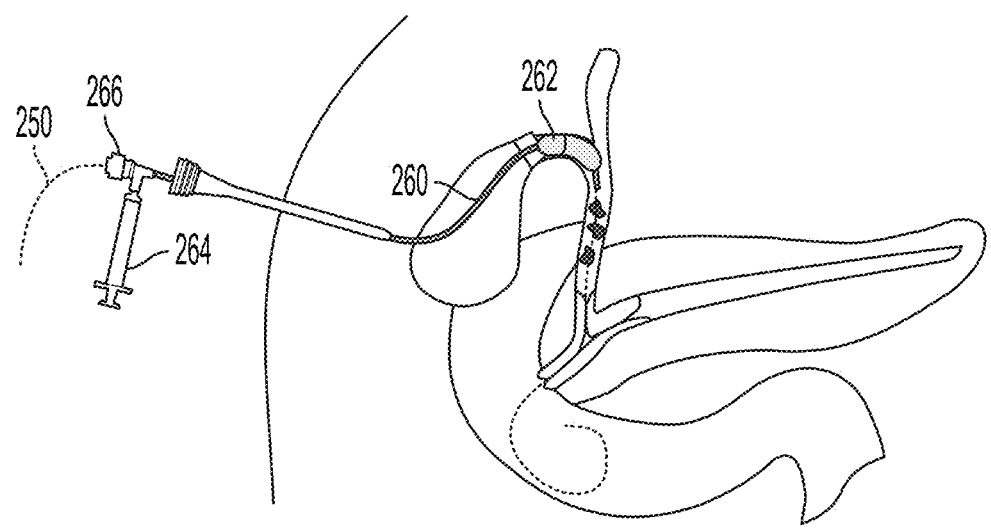
Figure 2G:
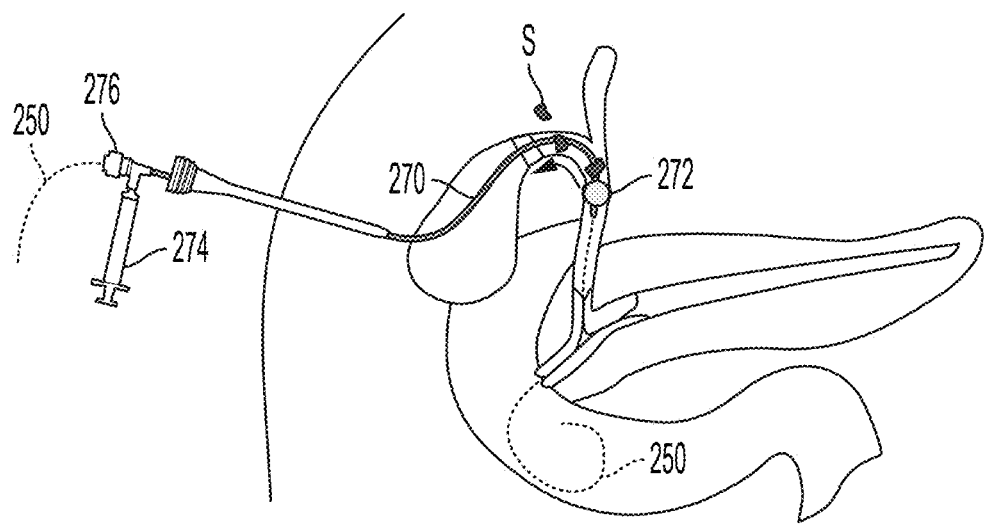
Figure 2H:
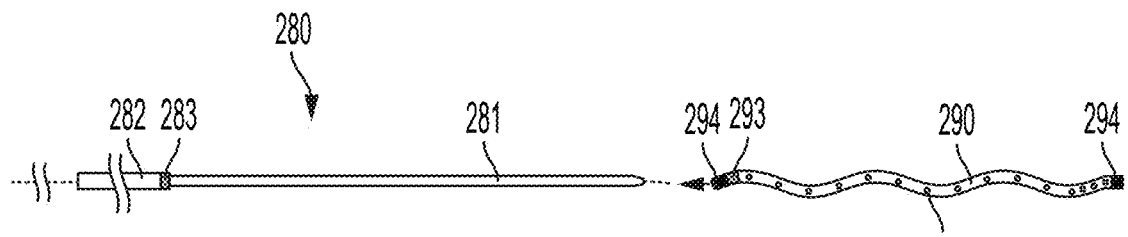
Figure 2I:
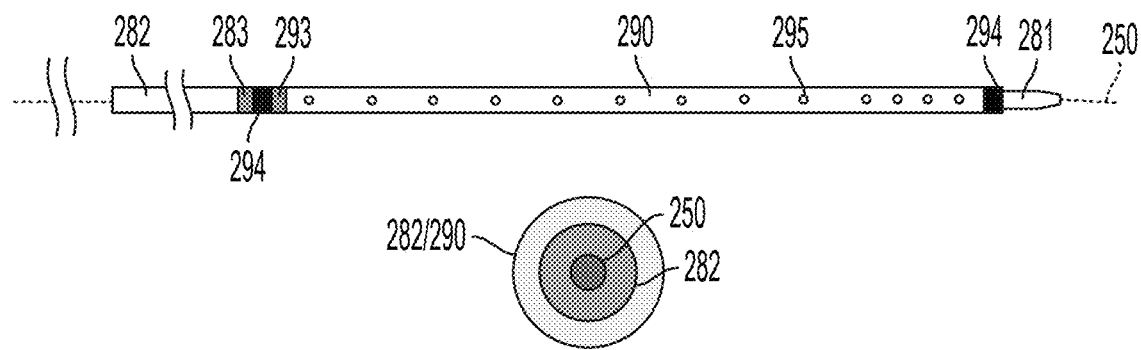
Figure 2J:
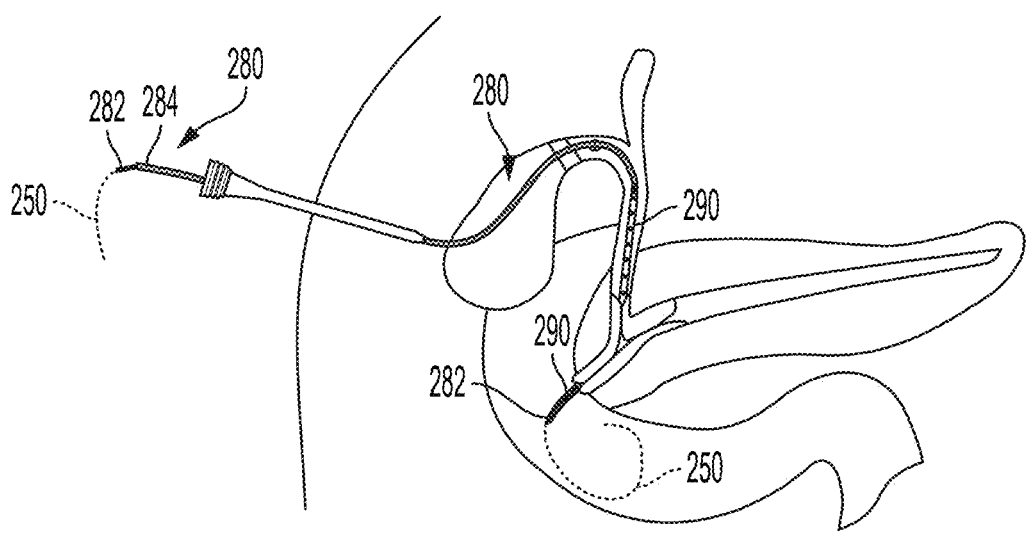
Figure 2K:
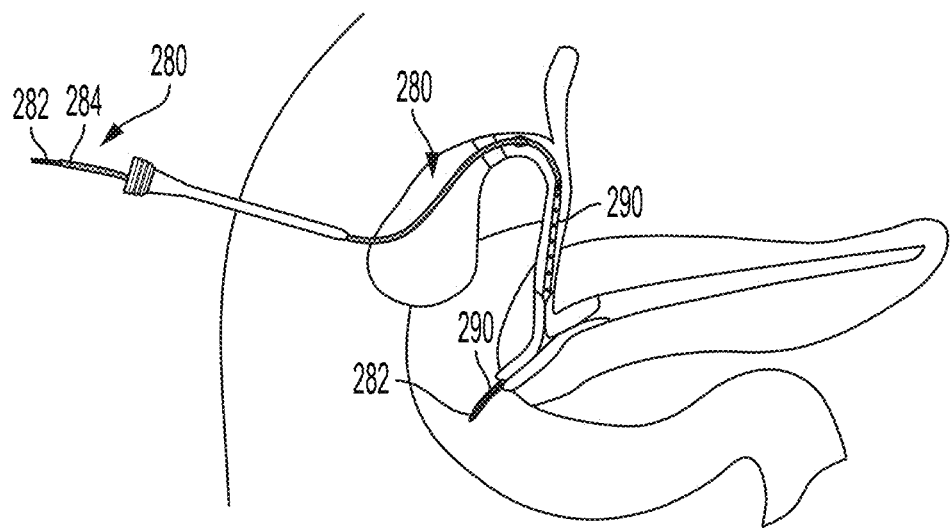
Figure 2L:
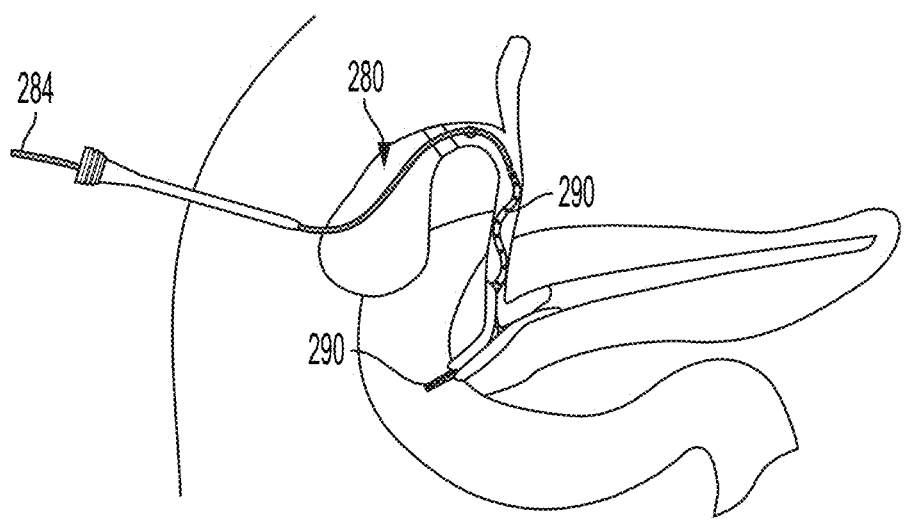
Figure 2M:
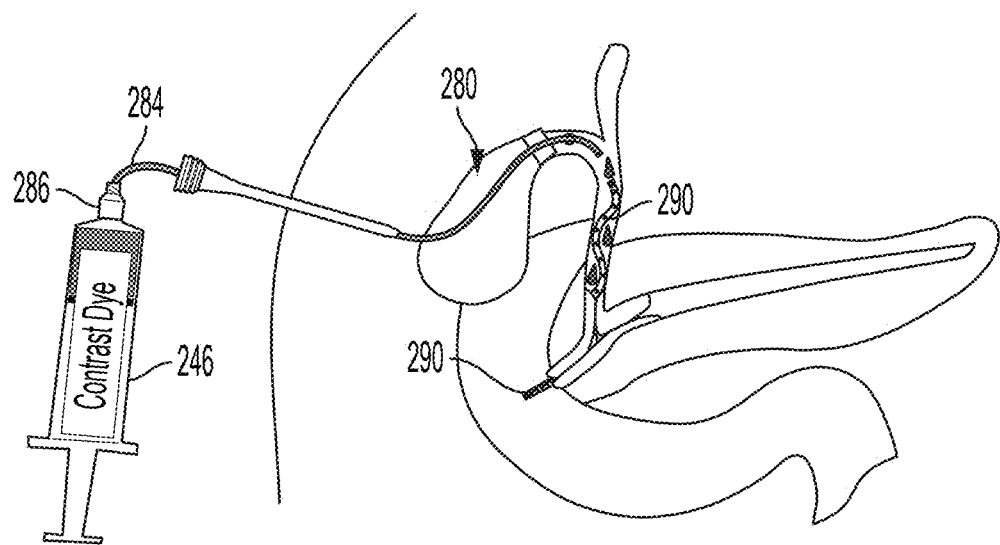
Figure 2N:
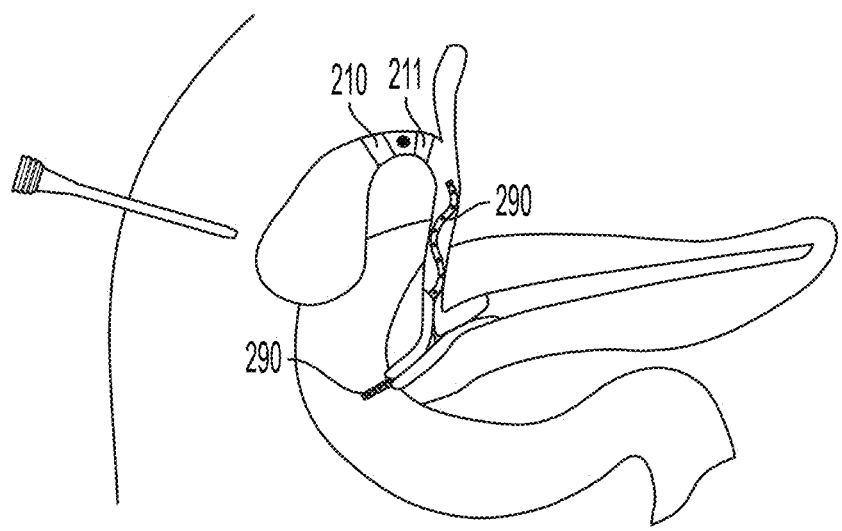
Figure 2O:
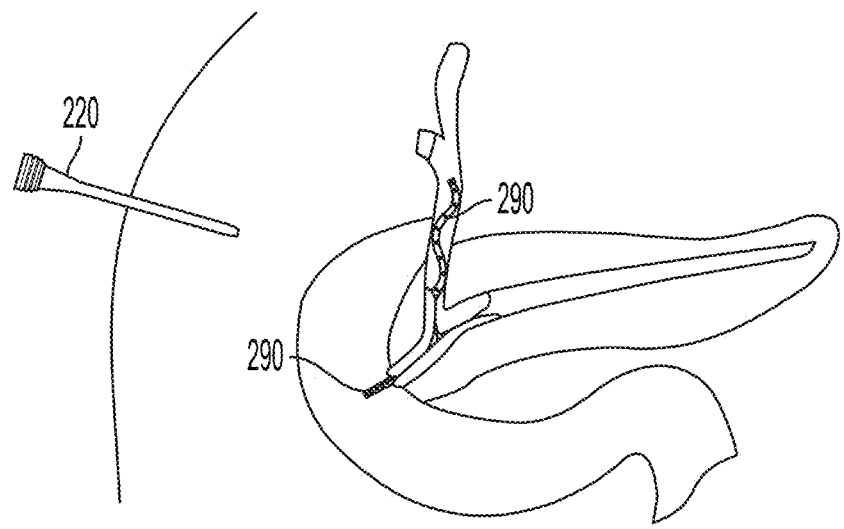
Figure 2P:
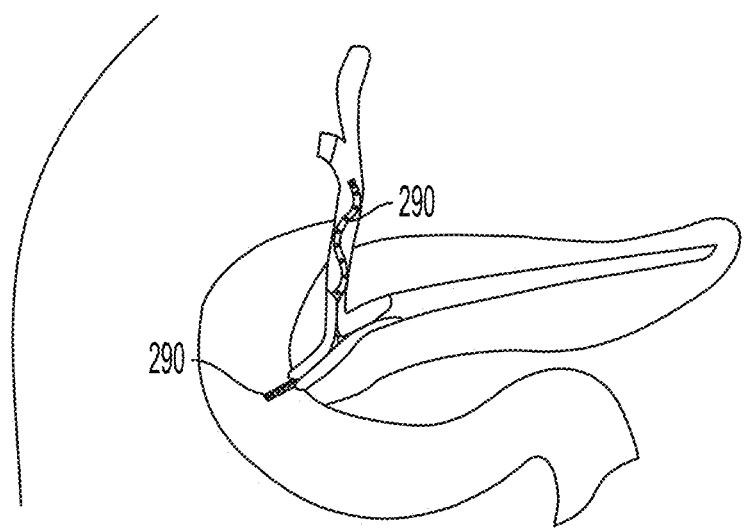

More particularly, FIGS. 2A-2P schematically illustrate the various steps contemplated herein in more detail. FIG. 2A schematically illustrates the abdominal wall 201 through which a bladeless pneumotrocar 220 is inserted. In this context, it should be appreciated that the bladeless pneumotrocar 220 will be inserted through a prior placed small incision, thereby reducing risk of inadvertent puncture of the liver, gall bladder, or colon as could be the case with conventional percutaneous trocars. The distal end of the pneumotrocar will typically be placed near the cystic bile duct 202, which is clamped off via clamp 210 from the gall bladder 202'. The common hepatic duct 203 joins the cystic bile duct 202 to so form the common bile duct 204, which may carry a burden of gall stones. Pancreas 205 has a pancreatic duct 206, which connects to the common bile duct 204. The sphincter of Oddi 207 then controls flow of the bile and pancreatic juice, which exits the sphincter at the papilla of Vater 208 into the duodenum 209 of the patient. At this point, it should be noted that the abdominal cavity of the patient will be insufflated to provide an enlarged workspace. Moreover, additional tools such as robotic tools and a camera may be percutaneously placed.

An incision is placed into the cystic bile duct 202 as shown in FIG. 2B, typically using a scalpel 224 or other suitable surgical tool. At this point, the pneumotrocar hermetically seals the insufflated cavity via a pierceable septum as is shown in more detail below. For imaging the biliary tree, a cholangiocatheter 240 is fed across the septum and through the pneumotrocar as schematically shown in FIG. 2C. Most typically, cholangiocatheter 240 will be dimensioned such that an outside surface of the cholangiocatheter will form a hermetic seal with an inside surface of the pneumotrocar, thus maintaining insufflation. The tip of the cholangiocatheter will preferably be a soft and pliable tip as discussed in more detail below and also carry a radiopaque marker for fluoroscopic guidance. Upon feeding the cholangiocatheter through the septum and pneumotrocar, the tip of cholangiocatheter 240 is inserted into the incision of the cystic duct to allow delivery of saline to flush the cystic and common bile duct prior to feeding a contrast dye into at least a portion of the biliary tree as also shown in FIG. 2C and FIG. 2D. Control over the fluids for delivery to the biliary tree is preferably achieved with a multi-port adapter 242 that allows selective introduction of fluids from respective syringes 244 and 246 (or pumps) into the cholangiocatheter and biliary tree. It is still further contemplated that the multi-port adapter 242 and/or the cholangiocatheter are also configured to allow passage of a guide wire through the cholangiocatheter, wherein the guide wire is advanced through the cholangiocatheter, pneumotrocar, cystic and common bile duct to the sphincter of Oddi and papilla of Vater into the duodenum as illustrated in FIG. 2E. In this context, it should be noted that the guide wire may pass through the multi-port adapter 242 (which may be configured as a Tuohy Borst adapter, or that the guide wire may be passed through a Luer adapter at the proximal end of the cholangiocatheter to which the multi-port adapter 242 is or was attached. Thus, the multi-port adapter may be a (preferably removable) Tuohy-Borst adapter, a two-way valve, or a three-way valve. Regardless of the entry of the guide wire, it should be appreciated that the cholangiocatheter may have a single lumen to allow passage of the fluids and the guide wire, or may have separate channels for passing the guide wire and the fluids.

Upon visualization of the cystic duct and the common bile duct (or even before visualization) using the contrast dye, the surgeon may decide that a cystic duct dilation is needed prior to subsequent steps such as stent placement and/or stone removal. To that end, a cystic duct balloon dilation catheter 260 may be fed over the wire 250 (after prior removal of the cholangiocatheter) as is schematically illustrated in FIG. 2F. Here, the cystic duct balloon dilation catheter 260 is placed with the inflatable balloon portion 262 resting in the cystic duct and balloon portion 262 is inflated to a desired diameter using air (or other fluid) delivered through syringe 264 and valve 266. As can be seen from FIG. 2F, the cystic duct balloon dilation catheter 260 has a (preferably) removable adapter 266 allowing passage of the guide wire 250 and attachment of syringe 264. In most embodiments, the cystic duct balloon dilation catheter 260 has an outside surface that is configured to form, in an uninflated configuration, a hermetic barrier with an inner surface of a pneumotrocar.

Where prior visualization has identified presence of gall stones or other removable obstructions, a stone removal balloon catheter 270 comprising an inflatable balloon portion 272 may be inserted into the common bile duct over wire 250, and inflated via air delivered from syringe 274 through removable adapter 276 as schematically depicted in FIG. 2G. Stones S can then be removed in a sweeping motion through he incision in the cystic bile duct. Most typically, the stone removal balloon catheter 270 has an outside surface that is configured to form, in an uninflated configuration, a hermetic barrier with an inner surface of the pneumotrocar.

Where the stones were not, or only partially removed, or for other indications as needed, a biliary stent may be placed into the common bile duct using a stent delivery device such that one portion of the stent extends into the duodenum and another portion of the stent remains in a common bile duct (note that the biliary stent may also extend into the cystic bile duct). Advantageously, the biliary stent is placed over the wire that is already in place. As such, it should be appreciated that the above devices and guide wire will be configured such as to allow all diagnostic (e.g., imaging) and treatment (dilation, stone removal, biliary stent placement) steps over the same wire, which significantly simplifies the entire procedure, ensures accuracy of placement of all surgical tools, and which dramatically reduces operative time.

Most preferably, and as exemplarily depicted in FIG. 2H, the stent delivery device 280 will have an inner canula 281 that is slidably engaged with and disposed within an outer cannula 282, wherein a biliary stent 290 is slidably engaged with and disposed about the inner canula 281 in a tensioned linear delivery configuration. Here, it is generally contemplated that the biliary stent 290 is entirely slid over the inner canula 281 such that a tip of the inner cannula will protrude from the distal end of the biliary stent. In this context, and as explained in more detail further below, it should be appreciated that the material of the biliary stent will allow for sufficient flexibility to enable a tensioned linear delivery configuration that provides sufficient tension to retain the stent on the inner cannula during deployment. Biliary stent 290 will further include a plurality of fenestrations 295, and in at least some embodiments, the number of fenestrations will be higher on the distal end (e.g., distal 50% or distal 40%, etc.) as compared to the proximal end (e.g., proximal 50% or proximal 40%, etc.) To facilitate proper insertion position, the stent 290 will have a color marker 293 on the proximal end that matches a color marker 283 on the distal end of the outer canula 282. Contemplated stents will further comprise radiopaque markers 293 and 294 on its respective ends to allow for fluoroscopic guidance during placement. The upper illustration in FIG. 2H depicts the stent delivery device before sliding the helical biliary stent 290 onto the inner cannula 281, while the middle illustration in FIG. 2H depicts the stent delivery device after sliding the helical biliary stent 290 onto the inner cannula 281. As can also be readily seen from FIG. 2H, the stent delivery device can be advanced over guide wire 250. The bottom illustration in FIG. 2H depicts a cross section of the stent delivery device of the middle illustration in FIG. 2H. Advantageously, the stent delivery device and/or the stent may have an outer surface that is configured to form a hermetic barrier with an inside surface of a pneumotrocar.

With further reference to FIG. 2J, the stent delivery device 280 is fed over guide wire 250 and through the septum and pneumotrocar into the cystic bile duct, the common bile duct, and through the sphincter of Oddi and papilla of Vater to the duodenum such that a portion of the stent 290 will be located in the duodenum. Here, a terminal soft portion of the inner cannula 282 will also protrude into the duodenum. Outside the patient the guide wire 250, the inner canula 282, and the outer cannula 284 of the stent delivery device are visible. Once proper placement of the stent is confirmed by fluoroscopy, the guide wire can be withdrawn as is schematically illustrated in FIG. 2K while inner and outer canula and stent remain in place. Upon removal of the guide wire 250, the inner cannula 282 is withdrawn and will disengage from stent 290, which will now elastically deform into a (partially) expanded helical deployment configuration, thereby radially expanding an inner wall of the duct to so retain the deployed stent within the duct as is schematically illustrated in FIG. 2L. To confirm proper placement and intervention, a completion cholangiogram can be performed using outer cannula 280 as the delivery channel for a contrast dye from syringe 246 that is removably coupled to the outer cannula 284 via a syringe-to-outer cannula adapter 286 (e.g., configured as a male Luer lock-to-hose portion) as is schematically shown in FIG. 2M. Once the completion cholangiogram is finished, the surgeon may then use clamp 211 to secure the cystic duct as depicted in FIG. 2N and opt to remove the gall bladder as schematically shown in FIG. 2O. Finally, the pneumotrocar can be removed and the incision in the abdominal wall sealed as is schematically shown in FIG. 2P.

While the above exemplary procedure has multiple steps in a specific sequence, it should be appreciated that the devices, kits, and methods presented herein may be used in a variety of alternative manners. For example, cystic duct dilation and/or stone removal need not necessarily be included, and in some cases, the guide wire may be placed prior to cholangiography. Moreover, while it is generally preferred that the methods presented herein will be performed using robotically assisted surgery, laparoscopic (and even open) methods are also expressly contemplated herein.

With further respect to pneumotrocars suitable for use herein, it should be noted that all known pneumotrocars are deemed appropriate. However, in particularly preferred aspects of the inventive subject matter, suitable pneumotrocars will be bladeless (i.e., will not include a sharpened edge or point that will pierce skin when pressed against the skin with moderate manual pressure commonly used for phlebotomy) so as to avoid inadvertent injury to liver, colon, or other tissues upon insertion across the abdominal wall. Moreover, it is generally preferred that contemplated pneumotrocars will include a tubular body having a proximal fluted portion and a distal portion, wherein a septum is coupled to the proximal fluted portion that hermetically seals a conduit formed by the tubular body. Most typically, the septum will comprise a pierceable portion and/or a flexible one-way valve, and the conduit will have an inner diameter that is configured to form a hermetic barrier with an outside surface of a cholangiocatheter, a cystic duct balloon dilation catheter, a stone removal balloon catheter, a stent delivery device and/or a stent coupled to the stent delivery device.

In this context, the terms "hermetic barrier", "form a hermetic barrier", "hermetically matched", and "hermetically sealing" are used interchangeably herein and refer to a sealing of the conduit in the pneumotrocar to a degree such that air flow through the conduit in the pneumotrocar is equal or less than 20%, and more typically equal or less than 10%, or equal or less than 5%, or equal or less than 2.5% of the airflow per time unit (e.g., 1 minute) through the conduit when the conduit is in an open (empty) configuration. Moreover, it should be appreciated that such hermetic barrier will typically be achieved by a relatively tight tolerance alone between the inner wall of the conduit and the item (e.g., catheter or stent) disposed within the conduit, but that such barrier may also be achieved by the septum and/or one-way valve alone (and in some cases a combination of septum and tight tolerance).

Figure 3A:
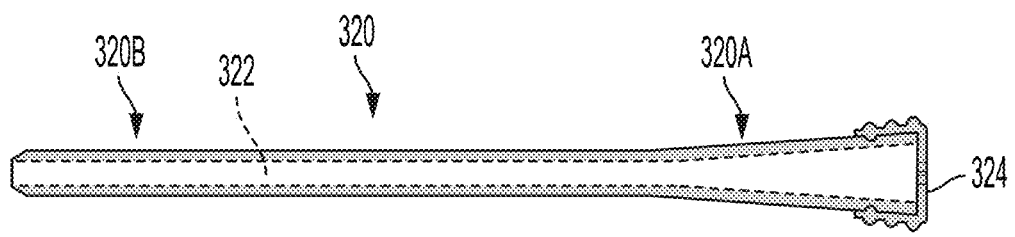
FIGS. 3A-3C and FIG. 3E are schematic illustrations showing exemplary views of a bladeless pneumotrocar.
Figure 3B:
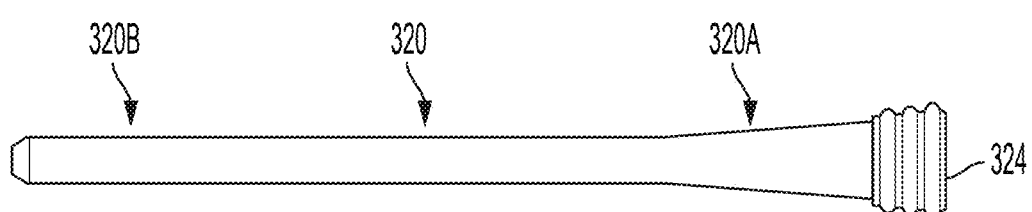

For example, FIG. 3A schematically depicts a cross section of a pneumotrocar 320 according to the inventive subject matter having a proximal fluted portion 320A and a distal portion 320B in which conduit 322 is formed. Septum 324 is coupled to the proximal fluted portion 320A and is typically manufactured from a flexible polymeric material such as from a silicone polymer or a natural or synthetic rubber. FIG. 3B schematically illustrates the pneumotrocar of FIG. 3A with proximal fluted portion 320A and distal portion 320B. As can be seen from FIG. 3B, septum 324 is configured as a cap with a portion that extends down the fluted portion and that the septum has an additional ridge 326 that can engage with a groove 327 in the fluted portion.

Figure 3C:
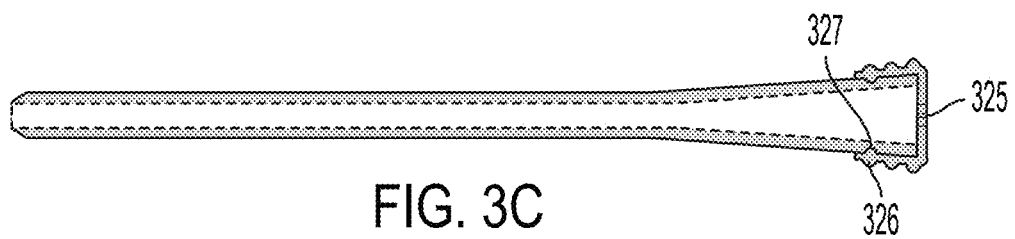
Figure 3D:
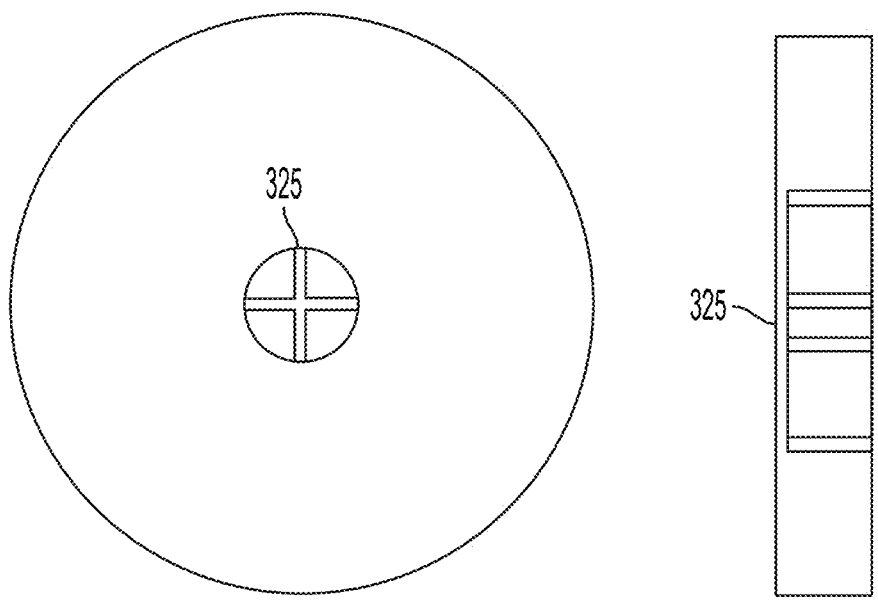
FIG. 3D and FIG. 3F are schematic illustrations showing exemplary septa for the bladeless pneumotrocar shown in FIGS. 3A-3C and FIG. 3E.
Figure 3E:
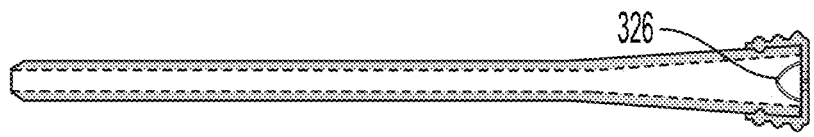
Figure 3F:
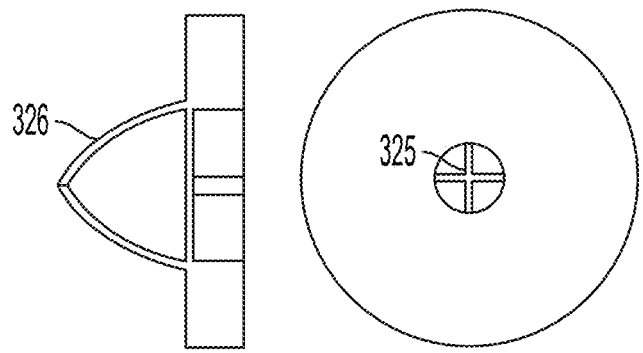

Therefore, and particularly where the septum is manufactured from an elastic material, it should be appreciated that the septum can be retained on the fluted portion via the groove and the ridge and via an elastic deformation force by a portion of the septum that extends over an outside of the fluted portion as is shown in FIG. 3C. While the septum may have a uniform thickness, it is also contemplated that the pierceable portion of the septum may have a thinned portion 325 (e.g., having a thickness of between 5-15%, or 15-25% or 25-50% of the remainder of the septum thickness) as exemplarily shown in FIG. 3D. Moreover, and where desirable, the septum may also include a one-way valve 326 (e.g., configured as a duckbill valve) that is in fluid communication with the pierceable portion as depicted in FIGS. 3E-3F.

Figure 3G:
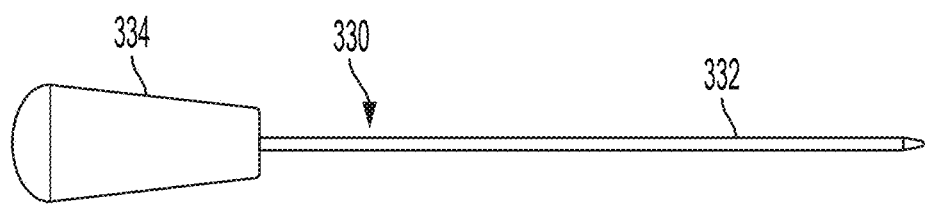
FIG. 3G is a schematic illustration showing an exemplary bladeless stylus for a bladeless pneumotrocar.
Figure 3H:
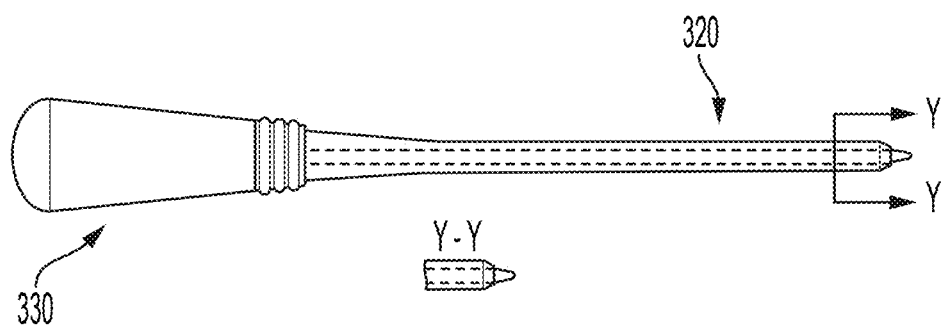
FIG. 3H is a schematic illustration showing an exemplary bladeless stylus inserted into a bladeless pneumotrocar.

To further facilitate insertion of the pneumotrocar through the incision in the abdominal wall, a removable bladeless stylus with an extended portion may be included that is slidably disposed in the conduit as exemplarily shown in FIG. 3G. Here the stylus 330 has an extended portion 332 that is slidably disposable in the conduit 322, and an elongated handle portion 334. FIG. 3H depicts an exemplary assembly for pneumotrocar 320 with stylus 330 ready for insertion. Most typically, the bladeless pneumotrocar and stylus are manufactured from a polymeric material that can be sterilized, typically with an overall length of between 7 cm and 15 cm, or between 10 cm and 20 cm, or between 15 cm and 25 cm, as measured from the end of the distal portion to the end of the handle portion. The inner diameter of the conduit 322 will preferably be between 2 mm (6 French) and 3.33 mm (10 French) to so accommodate the various tools as described here in a hermetically sealing manner. However, in alternative embodiments, the inner diameter may also be between 1 mm and 2.5 mm, or between 2.5 mm to 4.0 mm, and even larger.

Therefore, it should be appreciated that preferred pneumotrocars according to the inventive subject matter will be configured and have an internal diameter that allows passing of surgical tools for bile duct imaging using a contrast dye and bile duct stent placement, and optionally also cystic bile duct dilation and/or bile duct stone removal. Most preferably, the pneumotrocars contemplated herein will further maintain insufflation of the abdominal cavity of the patient and reduce (and more typically avoid) escape of fumes and aerosols from the abdominal cavity.

With respect to stents suitable for the kits and methods contemplated herein, it should be pointed out that all or almost all of the heretofore known biliary stents either failed to retain their position due to their straight geometry or carried the risk of irritation or even injury during placement and/or removal due to pointed barbs or other retention elements that engage with the inner wall of the bile duct. Likewise, where a biliary stent is configured with a pigtail, such pigtail configuration is often problematic due to its single point of contact with the inner wall of the bile duct that could lead to irritation or injury or that would fail to retain the biliary stent in the intended position. In a still other known biliary stent configuration where the stent has flat curvilinear portion, placement of the entire stent is typically limited to a location within the common bile duct and if not placed and retained within the Sphincter of Oddi and Papilla of Vater to so extend into the duodenum. Moreover, it should be appreciated that the heretofore know stents will only provide a small-diameter fluid path (defined by the lumen of the tubular stent material) that may be subject to clogging due to the viscous nature of bile fluid.

To complicate matters further, these and other known stents are generally placed in a retrograde manner using a retrograde placed wire from a duodenoscope. Unfortunately, such placement typically requires specialist tools and highly trained endoscopists and is in most cases only performed after imaging and as such necessitates separate procedures, thereby adding risk, cost, and patient discomfort.

In contrast, the inventor has now discovered that devices and methods for imaging processes can be modified to allow antegrade stent placement (and even additional procedures such as cystic bile duct dilation and/or stone removal with balloon catheter) following cholangiography in a single process. Indeed, the antegrade guide wire placement through a pneumotrocar (typically through a cholangiocatheter within the pneumotrocar) with subsequent deployment of all components through the pneumotrocar and over the guide wire allows precise placement in an expeditious manner. Moreover, and as discussed in more detail below, the helical stents contemplated herein allow secure placement and retention of the stent, even where the stent remains in place over a period of time, such as for example, between at least 1 day 7 days, or between 5 and 14 days, or between 1 days and 28 days, and even longer. Still further, it should be appreciated that the stents according to the inventive subject matter can be placed and removed without risk of injury otherwise possible due to retention elements such as barbs or flaps.

In particular, the inventor has now discovered that antegrade deployment of a biliary stent over a relatively long deployment path (as opposed to retrograde insertion) can be achieved by an approach in which retention of the stent on the deployment device and in the biliary duct is achieved using a predetermined/calculated balance of radial contractile force of the bile duct and expansion force of compressed stent where neither side 'wins', but where a balance point of forces determines the amount of radial expansion. Such force balance can be expressed as (1) the ratio of the Young's modulus of the stent polymer (e.g., between about 1.2 and 1.5 MPa) to the Young's modulus of bile duct wall as measured for radial expansion (e.g., between about 0.8 MPa and 1.2 MPa), and/or (2) the ratio of the spring constant of common bile duct (e.g., about 23,000 N/m) to the spring constant of the uncompressed stent in a deployed helical configuration (e.g., about 3340 N/m), which will result in an about 5% radial expansion of the bile duct. As will be readily appreciated, these ratios can be adjusted to achieve a desired radial expansion of the bile duct. Notably, such ratios will not only enable secure retention in the bile duct without irritation or injury, but also enable retention of the stent in a tensioned linear delivery configuration on the deployment device via frictional force between the stent and the antegrade delivery device.

Figure 4A:
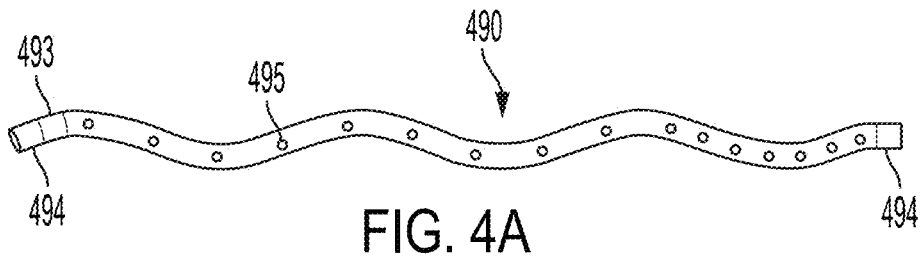
FIGS. 4A-4B are schematic illustrations for one exemplary helical biliary stent according to the inventive subject matter.
Figure 4B:
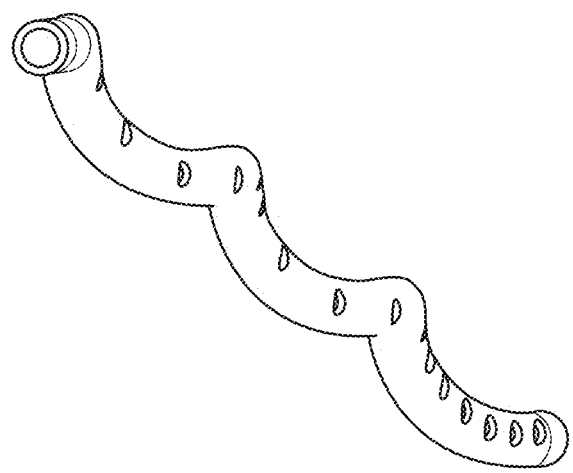

Exemplary helical stents are schematically shown in the side view of FIG. 4A and the perspective view of FIG. 4B, where the tubular and helically formed stent 490 has radiopaque markers 494 on the respective distal and proximal ends, and where a colored marker 493 is located at the proximal end to facilitate correct orientation on the stent delivery device. As can also be seen from these figures, the stent includes a plurality of fenestrations that will allow flow of bile from the outside of the stent into the intratubular space of the stent. Most typically, the fenestrations will be circular openings, but may also have other geometries. In still further contemplated aspects, it should be noted that the fenestrations need not be homogenously distributed along the longitudinal direction of the stent, but that the distal portion of the stent may have a larger number of fenestrations as compared to the proximal portion to so allow for an increased drainage capacity for the portion of the stent that extends through the sphincter of Oddi. For example, the number of fenestrations may be at least 5%, or at least 10%, or at least 15%, or at least 20%, or at least 33%, or at least 50%, or at least 75%, or at least 100% higher in the distal portion as compared to the proximal portion. In this context, it should be noted that the distal portion of the stent is the portion that extends from the distal end of the stent towards the middle of the stent over no more than 50%, or no more than 40%, or no more than 30%, or no more than 20% of the total length of the stent.

Figure 4C:
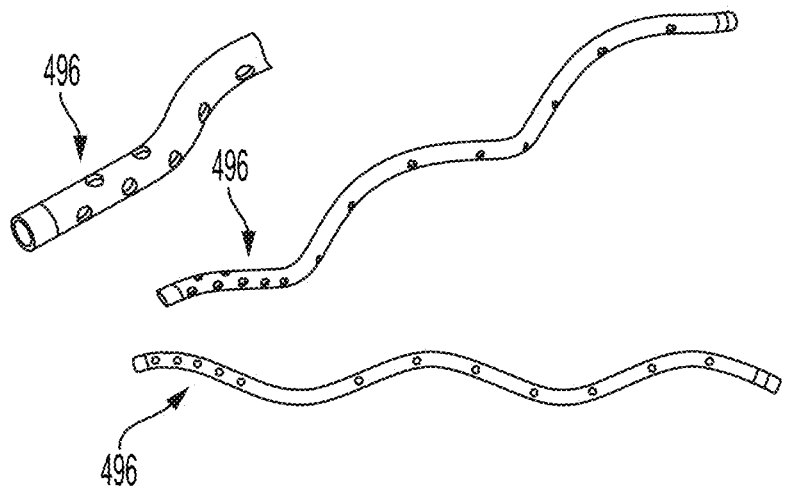
FIG. 4C depicts exemplary fenestration patterns for the biliary stent.
Figure 4D:
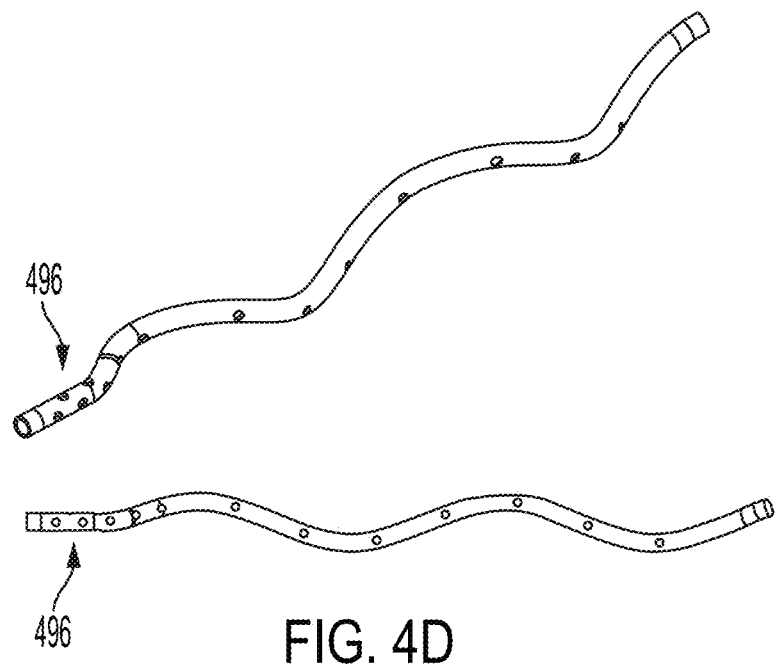
FIG. 4D depicts exemplary linear end portions for the biliary stent.
Figure 4E:
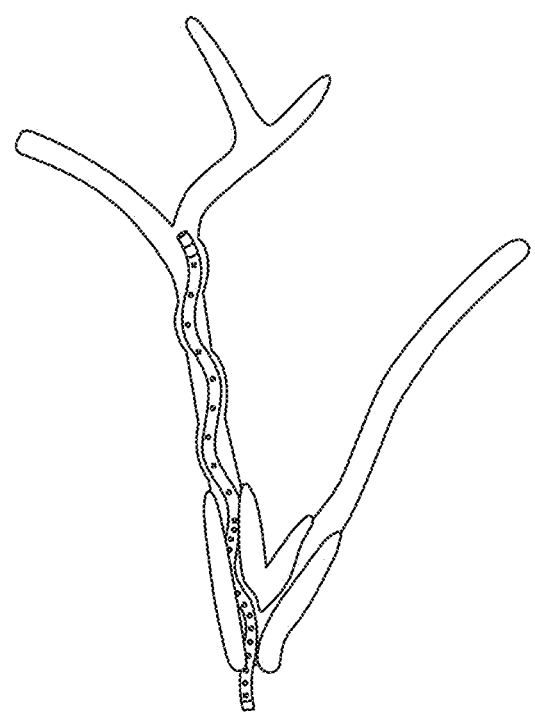
FIG. 4E exemplary shows placement of the helical biliary stent of FIGS. 4A-B in the common bile duct where the stent extends across the Sphincter of Oddi and Papilla of Vater.
Figure 5A:
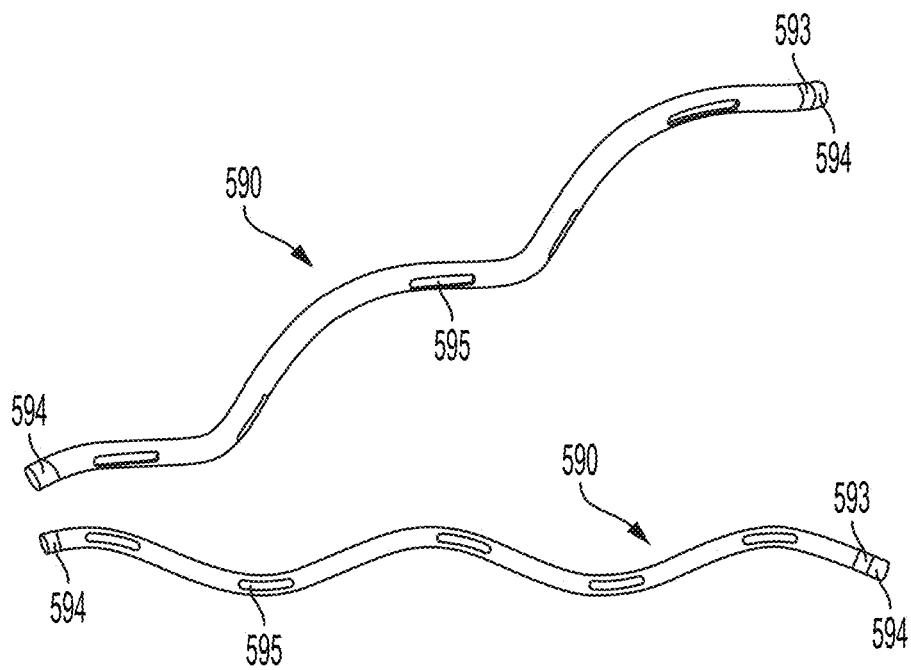
FIG. 5A is a schematic illustration for another exemplary helical biliary stent according to the inventive subject matter.
Figure 5B:
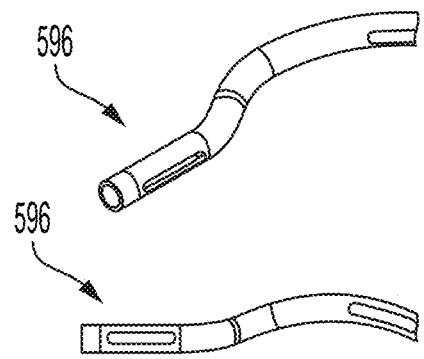
FIG. 5B depicts exemplary linear end portions for the biliary stent.
Figure 5C:
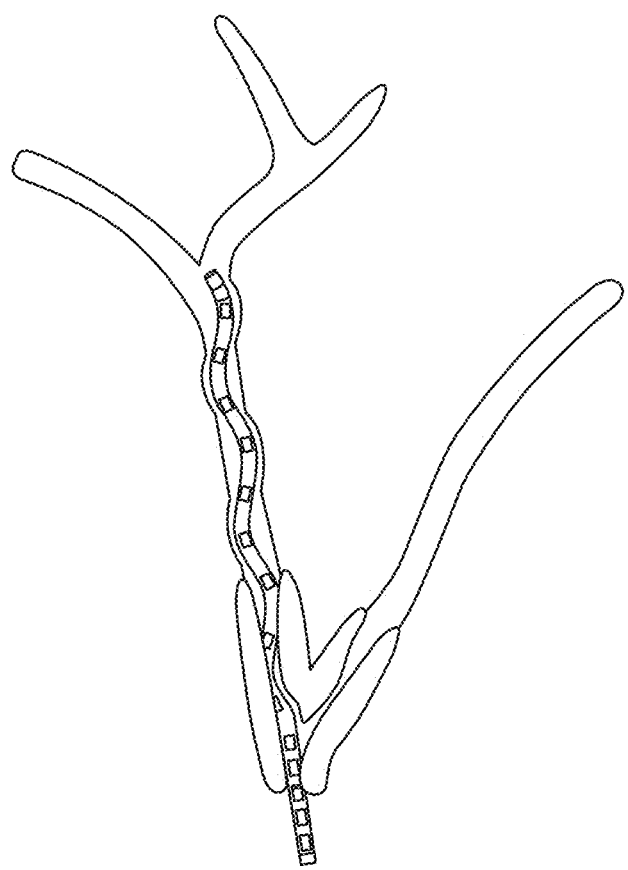
FIG. 5C exemplary shows placement of the helical biliary stent of FIG. 5A in the common bile duct where the stent extends across the Sphincter of Oddi and Papilla of Vater.

Additionally, it is contemplated that the stents contemplated herein may also include a non-helical portion 496 at the distal end, where the non-helical portion may be linear or curved, and exemplary non-helical portions are schematically depicted in FIG. 4C and FIG. 4D. Most typically, the non-helical portion will include one or more circular fenestrations, and will have a length of at least 5 mm, or at least 7 mm, or at least 10 mm, or at least 15 mm, or at least 20 mm, but generally less than 30 mm, or less than 25 mm, or less than 20 mm. Thus, exemplary non-helical portions may be between 5 mm and 15 mm, or between 10 mm and 20 mm. FIG. 4E exemplarily depicts placement of a stent as contemplated herein extending from the common bile duct through the sphincter of Oddi and across the ampulla of Vater into the duodenum. As can be seen from FIG. 4E, the distal portion has a larger number of fenestrations as compared to the proximal portion to accommodate increased volume flow of pancreatic juice and bile. In a similar manner, contemplated stents may also have rectangular fenestrations as schematically depicted in FIG. 5A and FIG. 5B to allow for a higher rate of fluid entering the intratubular space. As before, it is generally preferred that the helical stent has radiopaque markers 594 at the respective ends and a colored marker 593 to facilitate proper mounting on a stent delivery device. Such stents will typically (but not necessarily) include a non-helical portion 596 that may be curved or straight. FIG. 5C schematically illustrates placement of the stent of FIG. 5B extending from the common bile duct through the sphincter of Oddi and across the ampulla of Vater into the duodenum.

In this context, it should be appreciated that the helical biliary stent comprises a material (typically a polymeric material) and is formed such that the helical stent is elastically deformable from a helical configuration to a linear configuration to so allow for delivery on a stent delivery device. As noted before, it is generally preferred that the stent delivery device and the stent on the delivery device have an outer diameter that will allow passing the device and the stent on the device through the septum of the pneumotrocar and the conduit in the pneumotrocar, preferably in a hermetically sealing manner, and that the stent delivery device includes a channel that can accommodate a guide wire such that the stent delivery device and the stent can be advanced over the wire to the desired location. To that end, the stent delivery device may also include a radiopaque marker to assist proper positioning in the common bile duct.

Figure 6:
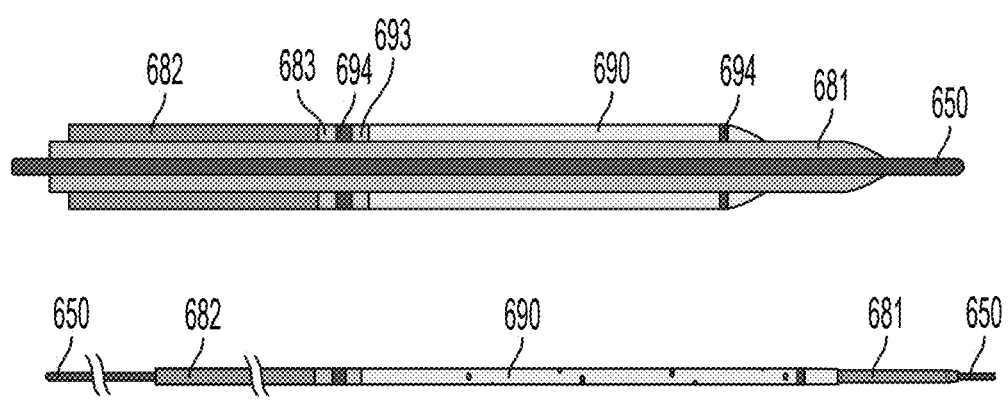
FIG. 6 depicts a cross section and a top view for an exemplary stent delivery device with a guide wire over which an inner canula is placed, and in which an outer cannula and a stent in a tensioned linear delivery configuration are placed over the inner cannula.

For example, FIG. 6 depicts an exemplary stent delivery device with a cross sectional view in the upper panel and a planar top view in the lower panel. Here, the stent delivery device comprises an inner cannula 681 that is slidably disposed within an outer cannula 682. Stent 690 is slidably engaged in a tensioned linear configuration over the inner cannula 681 such that the proximal end of the stent 690 abuts the distal end of the outer cannula 682. The distal end of the outer cannula 682 also includes a colored marker 683 that will match in color with the colored marker 693 on the proximal end of the stent 690. As noted before, proximal and distal ends of the stent 690 will comprise radiopaque markers 694. For delivery of the stent 690, the delivery device is placed over the guide wire 650, which most preferably has a soft and pliable tip to reduce the risk of inadvertent puncture when the guide wire is placed into through the cystic and common bile duct into the duodenum. As already noted before, it is generally contemplated that the guide wire is placed after the cholangiogram imaging step, and as such can be used to advance the stent delivery device (and optionally also the cystic duct balloon dilation catheter and/or the stone removal balloon catheter).

In particular, the helical stent is threaded over a portion of the inner cannula that extends beyond the outer cannula, thereby elastically deforming the helical configuration into a tensioned linear delivery configuration. In this context it should be especially noted that the Young's modulus of the material for the helical stent is not only effective to exert an expansive radial force onto the inner wall of the bile duct, but also effective to exert a frictional force on the outside surface of the inner cannula of the delivery device in the tensioned linear delivery configuration to so retain the stent on the delivery device. Such frictional force is especially advantageous as this will allow the physician to manipulate the stent delivery device and stent in the various environments (e.g., pneumotrocar, cystic bile duct, common bile duct, sphincter of Oddi, ampulla of Vater) without loss or premature deployment of the stent. Once the stent is located in the proper or desired location (e.g., proximal end in the common bile duct and distal end extending into the duodenum) as for example verified by fluoroscopy, the guide wire can be withdrawn, and the inner cannula retracted through the outer cannula to thereby disengage from the inner cannula and to elastically return to a helical deployment configuration.

Figure 7:
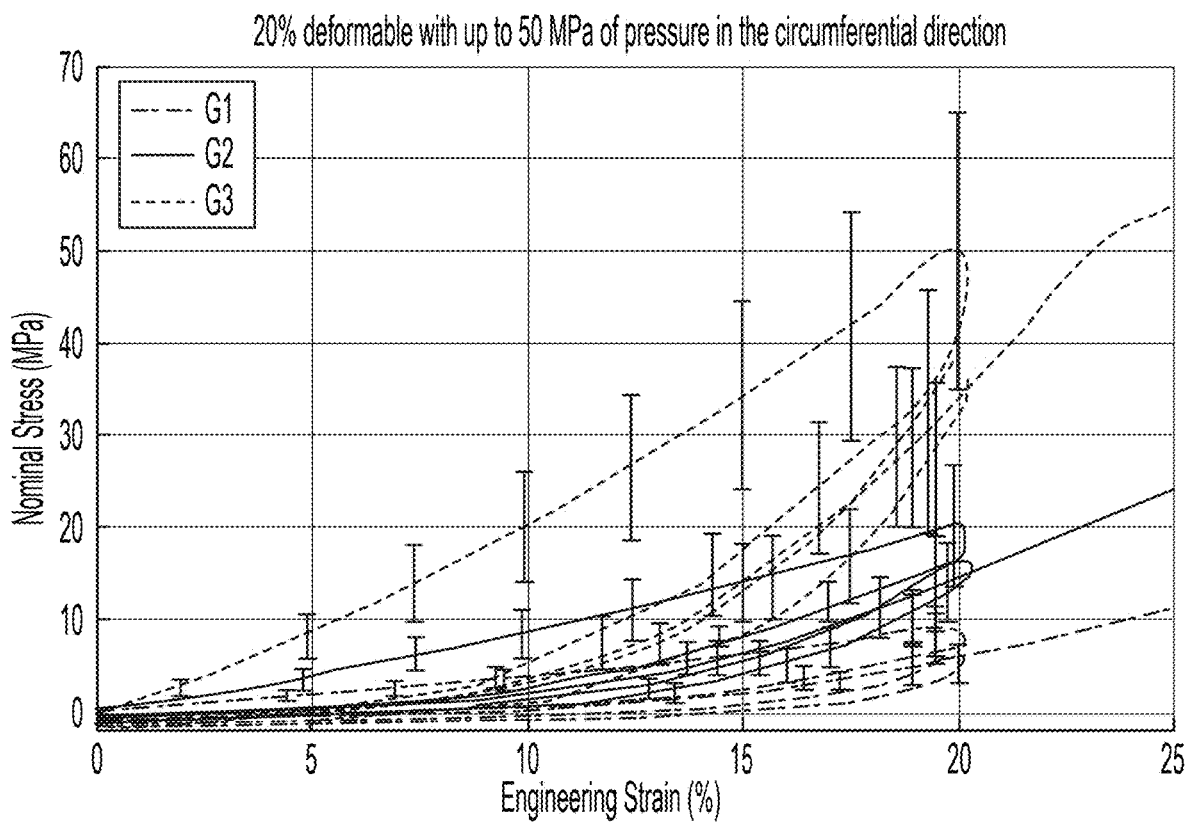
FIG. 7 is an exemplary stress/strain graph depicting bile duct radial deformability.
Figure 8:
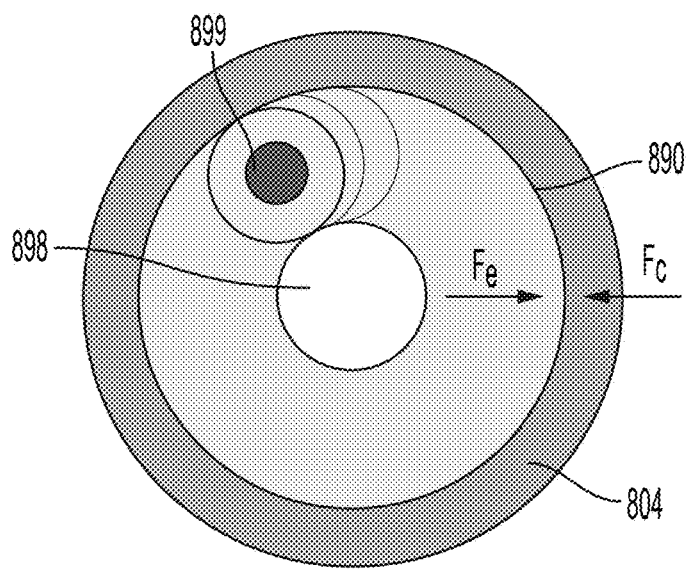
FIG. 8 is an exemplary schematic illustration depicting a stent according to the inventive subject matter placed in a bile duct where a radially expansive force of the stent is in equilibrium with radially contractive force of the bile duct, resulting in a substantially continuous helical radial extension of the bile duct.

With respect to the elastic return to the helical deployment configuration it should be recognized that the appropriate choice of the stent material and helical configuration will allow securing the helical stent into the bile duct in a manner in which the helical stent will produce, upon deployment, a radially expansive force onto the bile duct wall that will result in a desired radial expansion, while the bile duct will produce a contractile force counteracting the radially expansive force. At the balance point of these opposite forces, the bile duct will remain slightly radially expanded while retaining the helical stent via the contractile force. FIG. 7 depicts an exemplary stress/strain graph for radial expansion of a bile duct, while FIG. 8 schematically illustrates a transverse cross-sectional view of a bile duct with a helical stent deployed. Here, bile duct 804 is slightly expanded by the helical stent 890, resulting in elastic deformation and attendant contractile force $F_c$. Upon deployment within the bile duct, the helical stent will attempt to elastically return to the helical configuration, acting as a helical spring which exerts expansive force $F_e$. Thus, it should be appreciated that with the appropriate choice of material and configuration, the compressed spiral of the helical configuration can exert elastic deformation forces onto the inner wall of a bile duct (typically at least the common bile duct), while the bile duct will exert compressive forces onto the helical configuration, which will secure the stent in the bile duct without the need for barbs or other retaining elements, and which will avoid irritation or injury to the bile duct during placement and later withdrawal.

Moreover, and in contrast to heretofore known biliary stents, it should be recognized that the stent, in the helical deployment configuration, will form a composite fluid path that comprises an intrahelical fluid path 898 and an intratubular fluid path 899, thus greatly facilitating drainage throughout the bile duct. Advantageously, and due to the helical configuration, it should also be appreciated that the stent exerts radially expansive force over a substantial length of the stent allowing for significantly improved patency of the biliary duct. Most typically, contemplated stents the stent will exert radially expansive forces over a cumulative length of at least a quarter, or at least half, or at least three quarters of the overall length of the stent.

Figure 9:
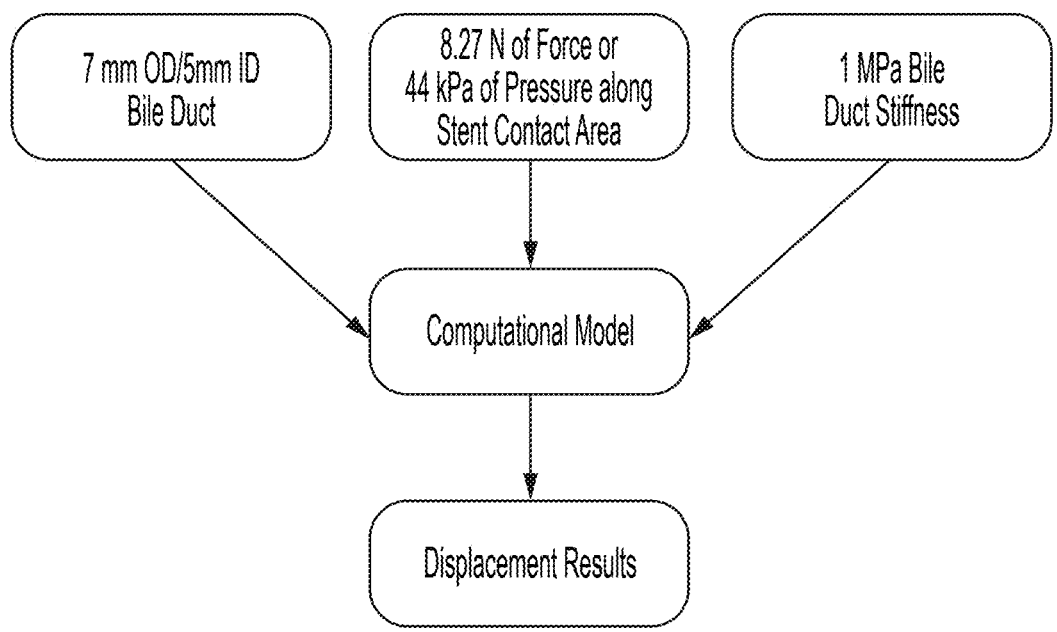
FIG. 9 depicts an exemplary computational model to calculate the various parameters desired for specific radial expansion of the bile duct.
Figure 10:
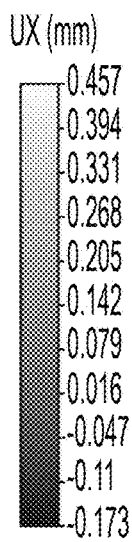
FIG. 10 graphically depicts an exemplary computational result.
Figure 10:
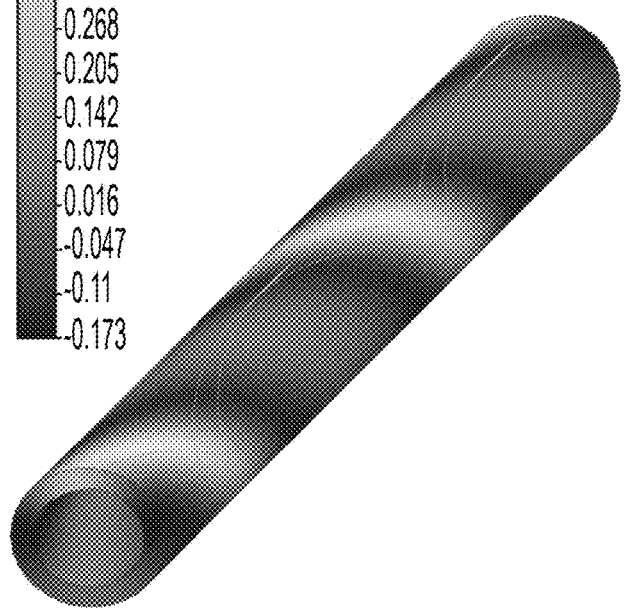

Based on the known biomechanical parameters of the biliary duct (or for that matter, any other biological duct such as the hepatic duct, pancreatic duct, or ureter), mechanical properties of a stent can now be calculated and designed in a computational model that takes into account the biomechanical parameters of the duct, the mechanical properties of the stent, and a desired degree of radial expansion as is schematically shown in FIG. 9. A typical output calculation using finite element analysis for bile duct expansion using a helical stent with a particular Young's modulus and spring constant is depicted in FIG. 10. As will be readily recognized, the appropriate choice of materials will determine the spring constant of the helical stent.

Figure 11A:
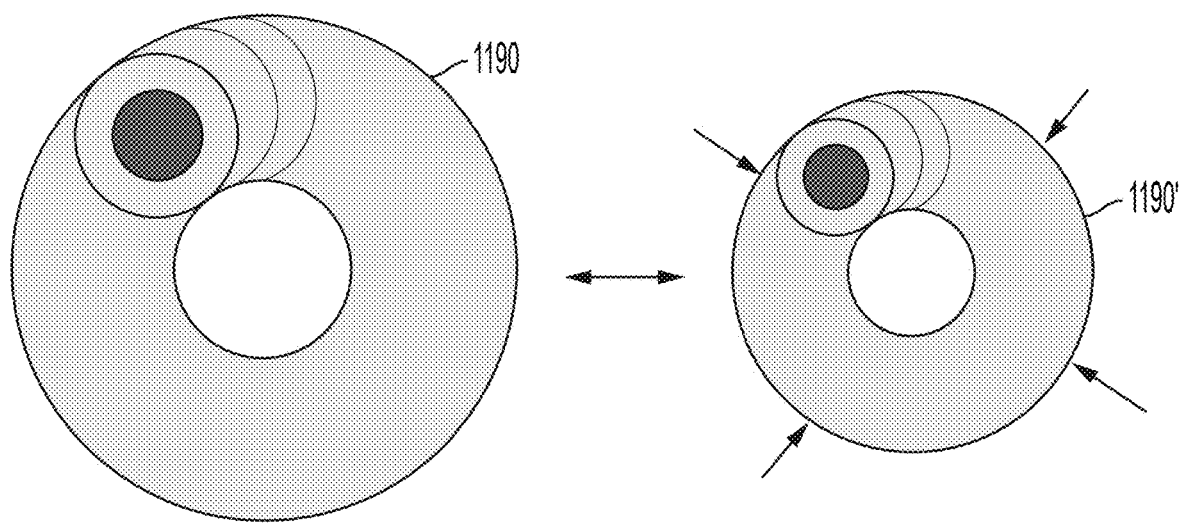
FIG. 11A is a schematic illustration for a helical biliary stent in an expanded helical deployment configuration without and with external compressive forces.

In addition, it is also important to note that here are two helical deployment configurations, a compressed helical (e.g., inside the bile duct) and an uncompressed helical (e.g., outside the bile duct) configuration as is exemplarily and schematically depicted in FIG. 11A where the stent 1190 on the left side is in the uncompressed helical configuration and where the stent 1190' on the right side is in the compressed helical configuration. Depending on the particular use and placement position, it should be appreciated that the stent can be configured to achieve a specific and desired degree of radial expansion of the vessel into which the stent is deployed. Most typically, the radial expansion will be within a range of expansion that is defined by an elastic (as opposed to plastic) deformation of the vessel. Therefore, stents can be configured to radially expand the inner wall of the (bile) duct by no more than 60%, or no more than 50%, or no more than 40%, or no more than 30%, or no more than 20%, or no more than 10%, or no more than 5%, or no more than 2%. Therefore, radial expansion of the inner wall may be between 2-8%, or between 5-12%, or between 10-20%, or between 15-30%, or between 20-40%. In that context, it should be noted that radial expansion is relative to an age-adjusted physiological normal (healthy) vessel diameter. For example, an age-adjusted physiological normal common bile duct vessel diameter for a 30 year-old male is 6 mm.

Therefore, and viewed from a different perspective, the Young's modulus of the vessel and the Young's modulus of the material for the stent, and/or the spring constant of the vessel and the spring constant of the stent can be adjusted relative to each other to achieve a specific radial expansion. For example, the ratio of the Young's modulus of the polymeric material to the Young's modulus of the bile duct for radial expansion may be selected such that, upon deployment of the stent, the inner wall diameter of the bile duct is increased by between 2% and 8%, or by between 3% and 10%, or by between 5% and 15%, or by between 10% and 20%, or by between 15% and 35%, or even more. Therefore, a suitable Young's modulus for the polymeric material of the helical stents contemplated herein is between 10.0 MPa and 6.8 MPa, or between 8.0 MPa and 5.0 MPa, or between 4.0 MPa and 1.2 MPa, or between 3.0 MPa and 0.8 MPa, or between 2.0 MPa and 0.3 MPa. Viewed from a different perspective, the ratio of the Young's modulus of the polymeric material of the helical portion to the Young's modulus of the biological vessel for radial expansion may be between 1.1:1 and 1.6:1, or between 1.2:1 and 1.9:1, or between 1.8:1 and 2.5:1, and even higher.

Alternatively, of additionally, it is contemplated that the ratio of a spring constant for radial expansion of the biliary stent and the spring constant for radial expansion of the bile duct is between 1.5:1 and 3.5:1, or between 2:1 and 5:1, or between 3:1 and 10:1, or between 7:1 and 20:1, or even higher. Most typically, however, the spring constant for radial expansion of the (biliary) stent will be between 300 N/m and 3,000 N/m, or between 1,000 N/m and 10,000 N/m, or between 7,000 N/m and 25,000 N/m, and/or the spring constant for radial expansion of the (bile) duct will be between 5,000 N/m and 15,000 N/m, or between 15,000 N/m and 30,000 N/m, or between 20,000 N/m and 45,000 N/m.

Thus, viewed from one perspective, contemplated stents will typically comprise a polymeric tubular body having a helical portion that is configured to helically engage with and radially extend a biological vessel into which the stent is placed. Most typically, the biological vessel will not be a blood vessel, and the polymeric material of the helical portion has a Young's modulus that is matched to the Young's modulus for radial expansion of the biological vessel such that radial expansion of the biological vessel by the helical portion is in an amount of between 2% and 20%. As already noted above, the Young's modulus of the polymeric material of the helical portion will also allow for elastic deformation of the helical portion into a linear delivery configuration.

Viewed from a different perspective, contemplated stents will typically comprise a polymeric tubular body having a helical portion that is configured to helically engage with and radially extend a biological vessel into which the stent is placed. Most typically, the biological vessel will not be a blood vessel, and the helical portion has a spring constant that is matched to the spring constant for radial expansion of the biological vessel such that radial expansion of the biological vessel by the helical portion is in an amount of between 2% and 20%. As also noted above, the spring constant of the helical portion will allow for elastic deformation of the helical portion into a linear delivery configuration.

It will further be understood that the stent will be dimensioned according to the type of vessel into which the stent is to be placed. Accordingly, contemplated biliary stents will typically have an outer diameter of between 2 mm (6 French) and 3.33 mm (10 French), such as for example, an outer diameter of 2.67 mm (8 French). However, and especially where larger vessels are to be stented, the outer diameter may also be between 3 mm and 5 mm, or between 4 mm and 8 mmm and in some cases between 6 mm and 10 mm, and even larger. Similarly, the length of contemplated stents will vary considerably, and suitable lengths will be at least in part determined by the particular location into which the stent is placed. For example, suitable biliary stents may have a length of between 5 cm and 9 cm, or between 7 cm and 11 cm, or between 9 cm and 13 cm, or between 11 cm and 17 cm, and even longer in the linear delivery configuration. Thus, appropriate lengths will include those with at least 7 cm, or at least 10 cm, or at least 13 cm, but typically less than 25 cm, or less than 20 cm, or less than 15 cm in the linear delivery configuration.

Furthermore, it is generally contemplated that the stents suitable for use herein will have at least 1.2 helical turns, or at least 1.5 helical turns, or at least 1.9 helical turns, or at least 2.4 helical turns, or at least 2.8 helical turns, or at least 3.2 helical turns, and/or that the stent, in the helical deployment configuration, forms a helix with an inner open diameter of between 1.2 mm and 2.4 mm, or between 2.0 mm and 4.5 mm, or between 3.0 mm and 5.0 mm, or between 4.5 mm and 6.5 mm, and in some cases even larger. Consequently, contemplated stents will typically have a length difference between the linear delivery configuration and the helical deployment configuration between 3.5% and 7.5%, or between 7.0% and 12.0%, or between 10.0% and 20.0%.

Figure 11B:
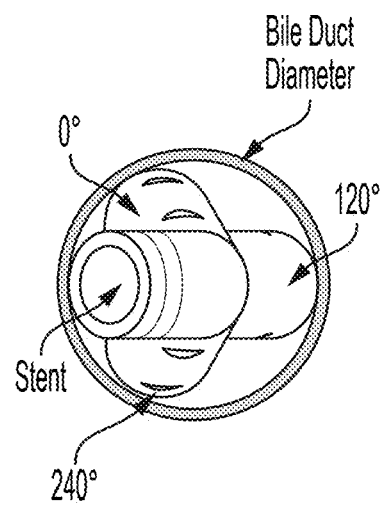
FIG. 11B and FIG. 11C depict exemplary alternate configurations.
Figure 11C:
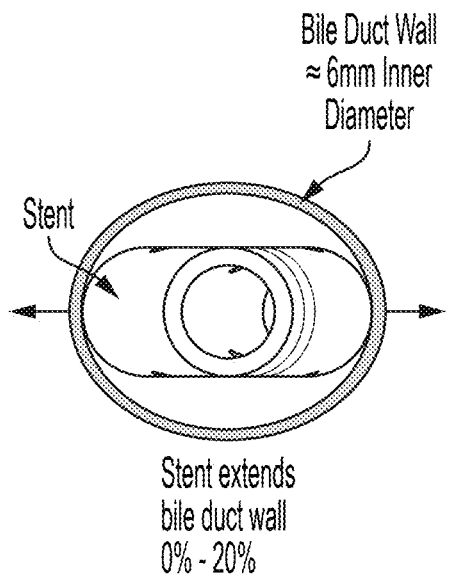

In still further contemplated, but less preferred aspects, the inventor also contemplates that the stent geometry need not necessarily be a helical geometry, but that various non-helical geometries are also deemed suitable for use herein. For example, contemplated alternate stent geometries may include stents with angled portions (e.g., wave segments) where each angled portion extends from the longitudinal axis of the stent in a plane that has at a radial offset from the plane of a prior angled portion. For example, the stent may have multiple angled portions, with the first plane at 0 degrees, the second plane at 120 degrees, and the third plane at 240 degrees as is exemplarily depicted in FIG. 11B. As will be readily appreciated, there may be more than three different planes with different angles, such as four, five, six, and even more. Moreover, with regard to the angled portions, these angled portions may have a continuous wave shape, a step shape, or include linear segments that contact the inside of the biliary duct in a longitudinal manner. Alternatively, the geometry of alternate stents may also be generally planar with a plurality of angles all substantially at the same plane as schematically illustrated in FIG. 11C.

With respect to the shape of the angled portions, the same considerations as provided above apply. Regardless of the exact configuration of these alternate geometries, it is contemplated, however, that these stents will also be designed and comprise materials as discussed above that will exert (1) a frictional force on an antegrade delivery device in the tensioned linear delivery configuration to so retain the tubular body on the delivery device, and (2) exert a radially expansive force on an inner wall of a bile duct in the expanded helical deployment configuration to radially expand the inner wall of the bile duct so retain the tubular body of the stent in the bile duct.

Still further, it is contemplated that additional alternate configurations need not necessarily comprise angled segments at one or more planes, but that the expansive forces may also be conveyed via elbow or radially extending flap portions that produce a predetermined force to so realize the frictional force and radial force as noted above.

Regardless of the particular dimensions, it is typically preferred (but not needed) that the stent has an outer diameter in the tensioned delivery configuration that is hermetically matched to the inner diameter of the pneumotrocar through which the stent is deployed. Moreover, it is also preferred that the stent has an outer diameter in the tensioned delivery configuration that is the same as the outer diameter of outer cannula of the antegrade delivery device.

As will be readily appreciated, contemplated stents will preferably be manufactured from a polymeric material or composite polymeric material (mixtures or heteropolymers), and especially suitable polymeric materials include low density polyethylene, high density polyethylene, polyethylene terephthalate, polyurethane, nylon, polyamide, polycarbonate, poly(ethylene-co-vinyl acetate) (PEVA), poly(n-butyl methacrylate) (PBMA), and all reasonable mixtures thereof. In addition, it is also contemplated that suitable stents may be manufactured from a biodegradable or bio-erodible/absorbable material such as polylactic acid, polyhydroxy butyric acid, tyrosine-derived polycarbonate polymers, etc.

Most typically, contemplated stents will be used for temporary stenting, and typical dwell times for a stent will therefore be between 1-3 days, or between 3-7 days, between 1-2 weeks, or between 2 and 4 weeks, and in some cases even longer, and particularly (but not necessarily) where the stent comprises a pharmaceutical agent that may be fixed or elutable. For example, contemplated pharmaceutical agents include one or more antimicrobial agents (such as antifungal agents, antibiotic agents, bacteriostatic agents, etc.), one or more chemotherapeutic agents (antineoplastic agents, cytotoxic agents, cytostatic agents, etc.), one or more anti-inflammatory agents (steroids, NSAIDS, etc.), immune modulatory agent (cytokines, chemokines, etc.), and/or one or more radioactive agent (preferably alpha emitters).

Figure 12:
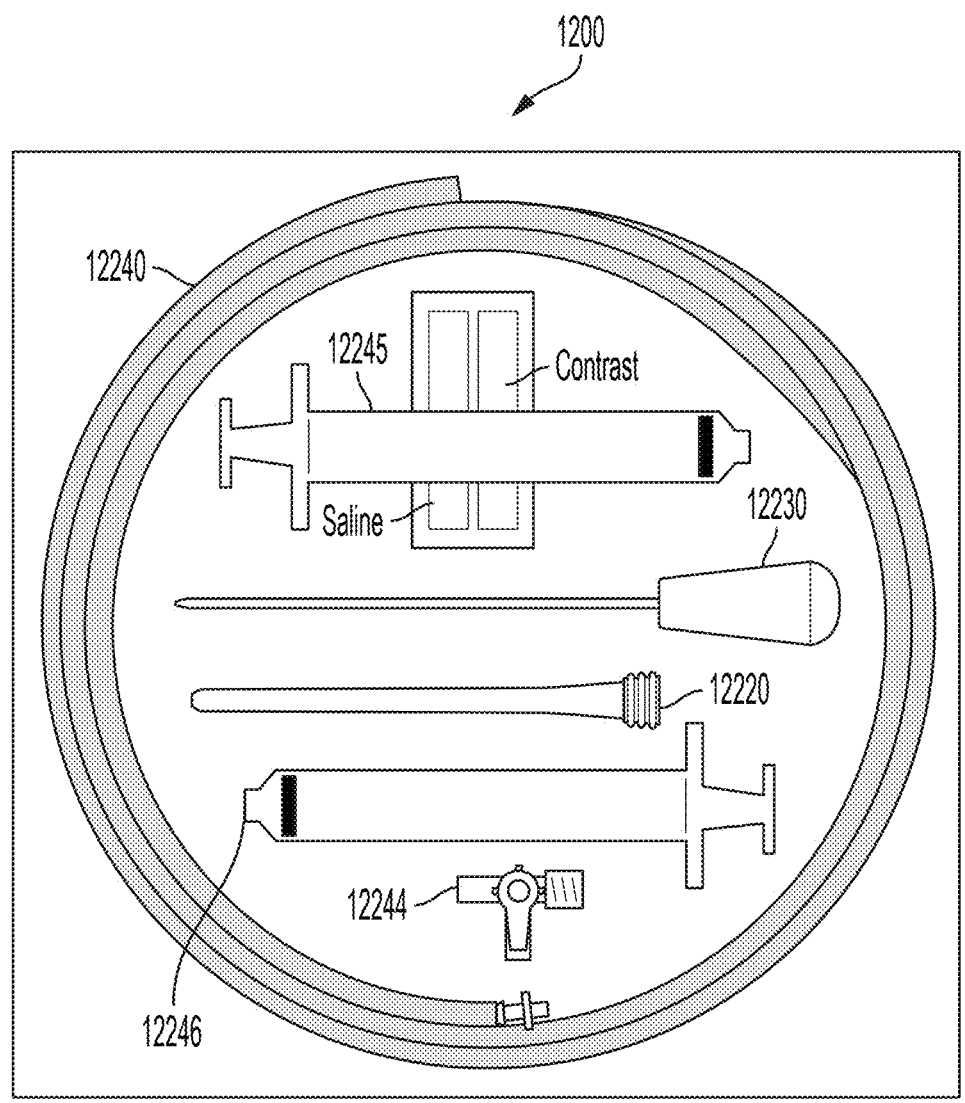
FIG. 12 is a schematic illustration for an exemplary cholangiography kit according to the inventive subject matter.

In still further contemplated aspects of the inventive subject matter, the inventor also contemplates various kits to facilitate imaging and surgical intervention. More particularly, and as exemplarily and schematically depicted in FIG. 12, the inventor contemplates a kit 1200 for cholangiography that includes in a sterile polymeric container a bladeless pneumotrocar 12200 with bladeless stylus 12230, a cholangiocatheter 12240, and a multi-port adaptor 12244 as described above, wherein the cholangiocatheter has a proximal end that is configured to allow attachment of the removable multi-port adaptor 12244 (e.g., Tuohy-Borst adapter, two-way valve, three-way valve, etc.) and/or wherein the cholangiocatheter (and proximal end) is configured to allow passage of a guide wire through the cholangiocatheter into the duodenum. As also noted earlier, it is generally preferred (but not required) that the pneumotrocar has an inner diameter that is configured to form a hermetic barrier with an outside surface the cholangiocatheter. Such imaging kit will typically also include two syringes 12245 and 12246, which may be pre-labeled or with separately provided labels, where the first syringe is used for rinsing with saline and the second syringe is for delivery of the contrast dye.

Most typically, saline and contrast dye will not be included in such imaging kits as these will be readily available to the practitioner. Preferred cholangiocatheters will have a flexible tip (e.g., terminal 3-5 mm or terminal 5-10 mm, or terminal 7-15 mm) that can be bent at least 30 degrees using mild manual force like the force used to hold a pencil on one end between the tips of two fingers. Additionally, it is generally preferred that the cholangio-catheter will have a radiopaque marker proximal to the tip to allow fluoroscopic verification of the proper position in the cystic duct.

Figure 13A:
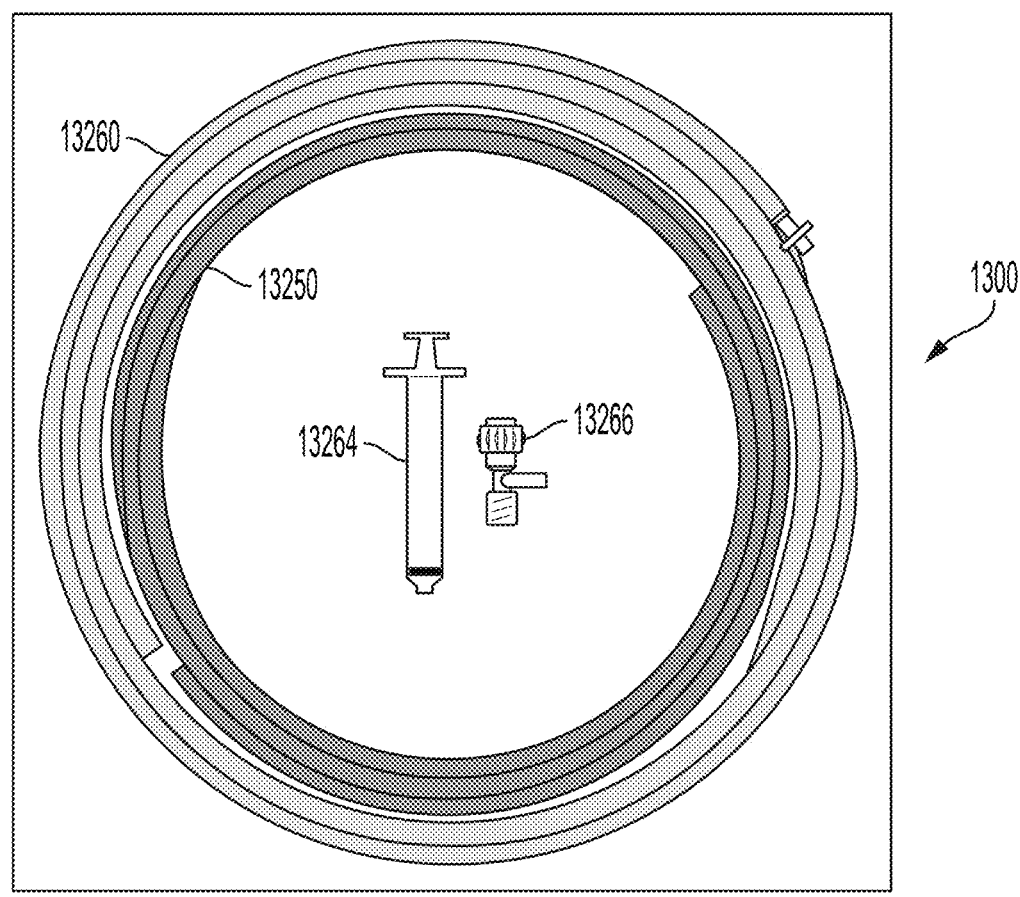
FIG. 13A is a schematic illustration for an exemplary cystic duct dilation kit according to the inventive subject matter, and FIG. 13B schematically depicts an exemplary cystic duct balloon dilation catheter with a removable adapter through which a guide wire is routed and to which a syringe is attached.
Figure 13B:
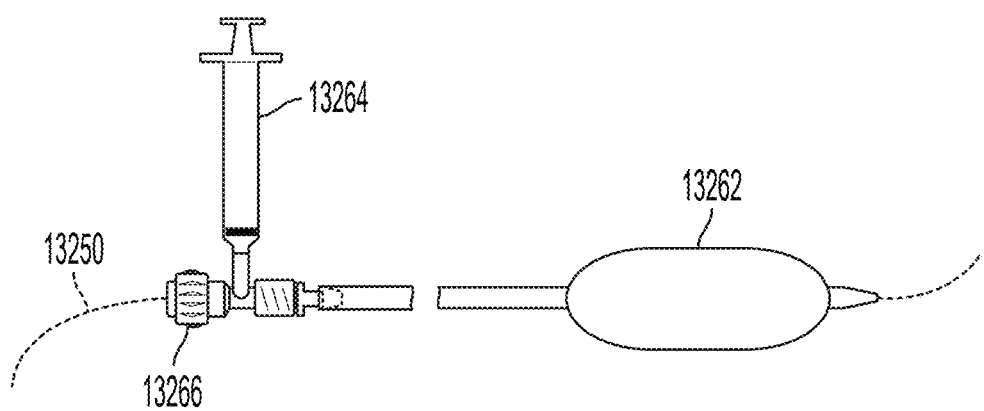

In another example, and as exemplarily and schematically depicted in FIG. 13A, the inventor also contemplates a kit 13000 for cystic duct dilation that includes in a sterile polymeric container a cystic duct balloon dilation catheter 13260, a guide wire 13250, and a syringe 13264 along with removable adapter 13266. Most typically, the cystic duct balloon dilation catheter 13260 will include an inflatable balloon portion, and the cystic duct balloon dilation catheter further comprises a channel that is configured to receive a guide wire. In such contemplated kits, the removable adapter is configured to allow passage of a guide wire and to allow attachment of a syringe. As noted above, it is further preferred (but not required) that the cystic duct balloon dilation catheter has an outside surface that is configured to form, in an uninflated configuration, a hermetic barrier with an inner surface of a pneumotrocar. FIG. 13B schematically and exemplarily depicts the cystic duct balloon dilation catheter 13260 with an inflated balloon portion 13262, where the air needed for inflation is provided via syringe 13264 via removable adapter 13266. Guide wire 13250 can also be threaded through the removable adapter 13266 and the cystic duct balloon dilation catheter may use a separate channel for passing the guide wire through the catheter.

Figure 14A:
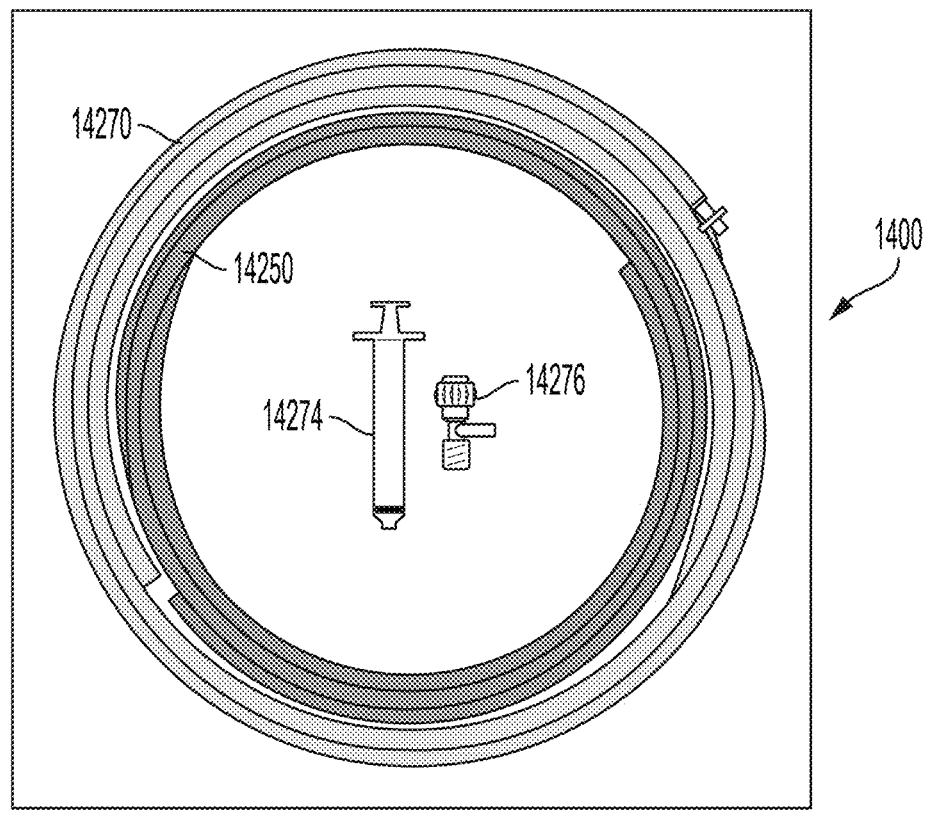
FIG. 14A is a schematic illustration for an exemplary stone removal kit according to the inventive subject matter, and FIG. 14B schematically depicts an exemplary stone removal balloon catheter with a removable adapter through which a guide wire is routed and to which a syringe is attached.
Figure 14B:
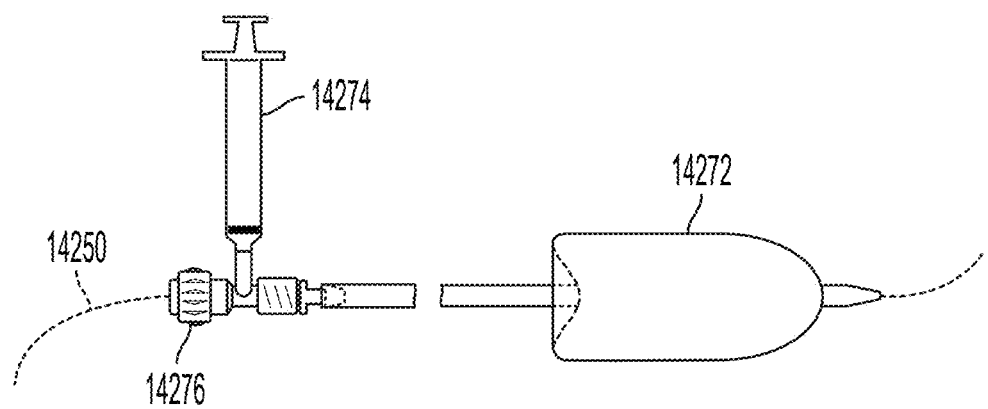

In still another example, and as exemplarily and schematically depicted in FIG. 14A, the inventor also contemplates a kit 14000 for stone removal that includes a stone removal balloon catheter 14270 that has an inflatable balloon portion, wherein the stone removal balloon catheter further comprises a channel that is configured to receive guide wire 14250, also part of the kit. Preferably, but not necessarily, the stone removal balloon catheter has an outside surface that is configured to form, in an uninflated configuration, a hermetic barrier with an inner surface of a pneumotrocar. Balloon inflation is typically performed using air from syringe 14274 that is attached to the stone removal balloon catheter 14270 via removable adapter 14276. FIG. 14B schematically and exemplarily depicts the stone removal balloon dilation catheter 14270 with an inflated balloon portion 14272, where the air needed for inflation is provided via syringe 14274 via removable adapter 14276. Here, it is preferred (but not required) that the inflatable portion has a concave surface that can engage and retain stones during removal. Guide wire 14250 can also be threaded through the removable adapter 14276 and the stone removal balloon catheter may use a separate channel for passing the guide wire through the catheter. As will be readily appreciated, the syringe will have a volume suitable for inflation of the inflatable balloon portion.

Figure 15:
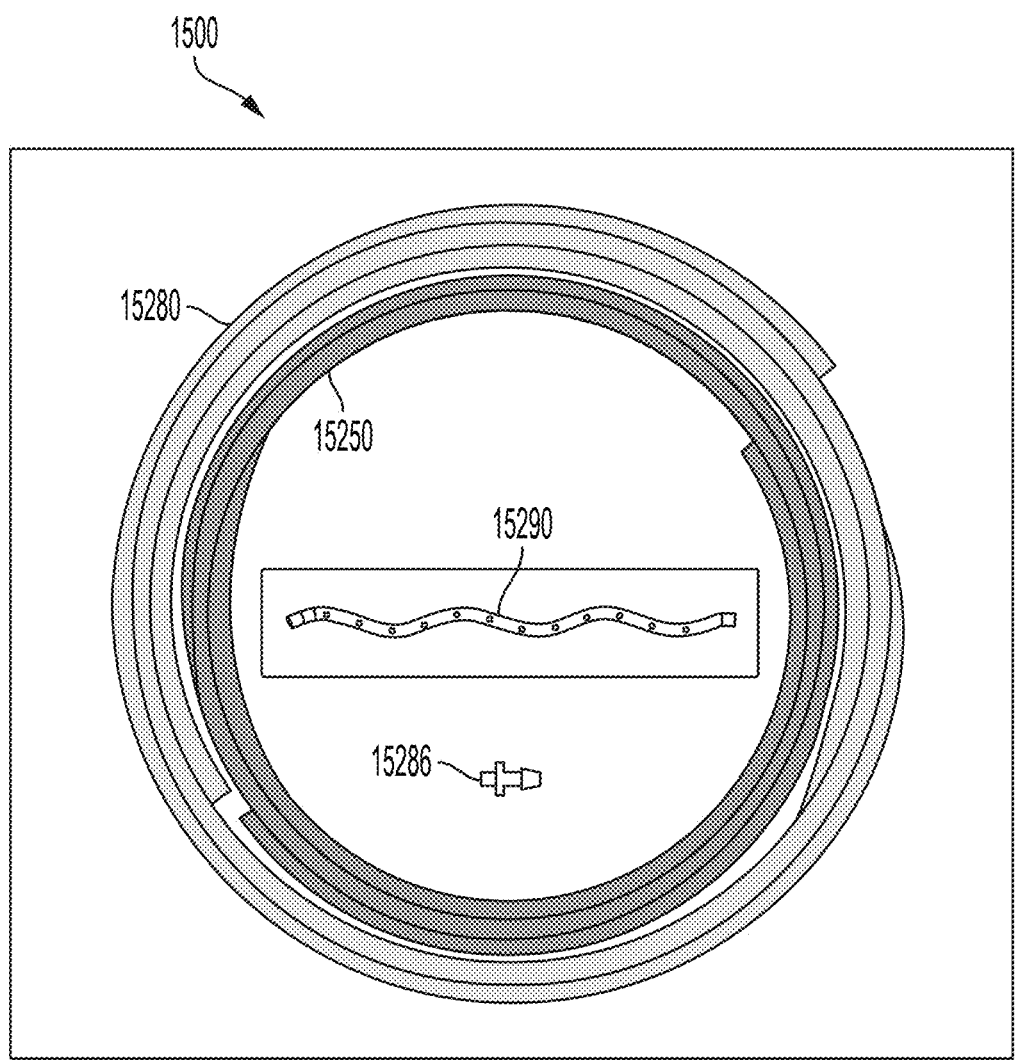
FIG. 15 is a schematic illustration for an exemplary stent delivery device kit according to the inventive subject matter containing a stent delivery device comprising an inner cannula disposed within an outer cannula, a biliary stent, a guide wire, and a syringe-to-outer cannula adapter.

In yet another example, and as exemplarily and schematically depicted in FIG. 15, the inventor also contemplates a kit 15000 for stent placement that includes a stent delivery device 15280, a stent 15290, a guide wire 15250, and a syringe-to-outer cannula adapter 15286. Most typically, and as already described in more detail above, the stent delivery device 15280 comprises an inner cannula that is disposed within an outer cannula, wherein the inner cannula is configured to extend beyond the outer cannula and wherein the inner cannula is further configured to slidingly receive and retain the stent 15290 in the portion extending beyond the outer cannula. As will be appreciated, particularly preferred stents as those as described above.

In some embodiments, the numbers expressing quantities of ingredients, properties such as concentration, reaction conditions, and so forth, used to describe and claim certain embodiments of the invention are to be understood as being modified in some instances by the term "about." As used herein, the terms "about" and "approximately", when referring to a specified, measurable value (such as a parameter, an amount, a temporal duration, and the like), is meant to encompass the specified value and variations of and from the specified value, such as variations of +/−10% or less, alternatively +/−5% or less, alternatively +/−1% or less, alternatively +/−0.1% or less of and from the specified value, insofar as such variations are appropriate to perform in the disclosed embodiments. Thus, the value to which the modifier "about" or "approximately" refers is itself also specifically disclosed. The recitation of ranges of values herein is merely intended to serve as a shorthand method of referring individually to each separate value falling within the range. Unless otherwise indicated herein, each individual value is incorporated into the specification as if it were individually recited herein.

As used herein, the term "administering" a pharmaceutical composition or drug refers to both direct and indirect administration of the pharmaceutical composition or drug, wherein direct administration of the pharmaceutical composition or drug is typically performed by a health care professional (e.g., physician, nurse, etc.), and wherein indirect administration includes a step of providing or making available the pharmaceutical composition or drug to the health care professional for direct administration (e.g., via injection, infusion, oral delivery, topical delivery, etc.). It should further be noted that the terms "prognosing" or "predicting" a condition, a susceptibility for development of a disease, or a response to an intended treatment is meant to cover the act of predicting or the prediction (but not treatment or diagnosis of) the condition, susceptibility and/or response, including the rate of progression, improvement, and/or duration of the condition in a subject.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A biliary stent, comprising:
a tubular body having a proximal portion with a proximal end and a distal portion with a distal end;
wherein the tubular body is deformable between a tensioned linear delivery configuration and an expanded helical deployment configuration;
wherein the tubular body comprises a polymeric material having a Young's modulus that is effective to
  (a) exert a frictional force on an antegrade delivery device in the tensioned linear delivery configuration to so retain the tubular body on the delivery device; and
  (b) exert a radially expansive force on an inner wall of a bile duct in the expanded helical deployment configuration to radially expand the inner wall of the bile duct so retain the tubular body in the bile duct;
a plurality of fenestrations in the tubular body;
wherein a spring constant for radial expansion of the biliary stent is between 1,000 N/m and 10,000 N/m, and/or wherein a spring constant for radial expansion of the bile duct is between 15,000 N/m and 30,000 N/m; and
wherein the stent, in the helical deployment configuration, forms a composite fluid path comprising an intrahelical fluid path and an intratubular fluid path.

2. The stent of claim 1, wherein the distal portion further comprises a non-helical portion, and/or wherein the number of fenestrations in the distal portion is higher than the number of fenestrations in the proximal portion.

3. The stent of claim 2, wherein the non-helical portion has a length to allow placement of the non-helical portion through a hepatopancreatic ampulla of Vater into a duodenum.

4. The stent of claim 1, wherein the stent exerts the radially expansive force over a cumulative length of at least half of an overall length of the stent.

5. The stent of claim 1, wherein the stent is configured to radially expand the inner wall of the bile duct between 2% and 20%.

6. The stent of claim 1, wherein a ratio of the Young's modulus of the polymeric material to a Young's modulus of the bile duct for radial expansion is selected such that, upon deployment of the stent, an inner wall diameter of the bile duct is increased by between 3% and 10%.

7. The stent of claim 1, wherein a ratio of a spring constant for radial expansion of the biliary stent and a spring constant for radial expansion of the bile duct is between 3:1 and 10:1.

8. The stent of claim 1, wherein the stent does not comprise a retention element extending away from the tubular body.

9. The stent of claim 1, wherein the stent has an outer diameter between 2 mm (6 French) and 3.33 mm (10 French).

10. The stent of claim 1, wherein the stent has a length of between 9 cm and 13 cm in the linear delivery configuration.

11. The stent of claim 1, wherein the stent, in the helical deployment configuration, forms a helix with an inner open diameter of between 3 mm and 5 mm.

12. The stent of claim 1, wherein the stent has at least 1.5 helical turns.

13. The stent of claim 1, wherein the polymeric material further comprises a pharmaceutical agent selected from the group consisting of an antimicrobial agent, a chemotherapeutic agent, an anti-inflammatory agent, an immune modulatory agent, and a radioactive agent.

14. A stent, comprising:
a polymeric tubular body having a helical portion that is configured to helically engage with and radially extend a biological vessel into which the stent is placed, wherein the biological vessel is not a blood vessel;
wherein the helical portion has a spring constant that is matched to a spring constant for radial expansion of the biological vessel such that radial expansion of the biological vessel by the helical portion is in an amount of between 2% and 20%;
wherein the spring constant of the helical portion allows for elastic deformation of the helical portion into a linear delivery configuration;
wherein the polymeric tubular body further comprises a plurality of fenestrations, and optionally further comprises a non-helical portion;
wherein the stent forms, upon insertion into the biological vessel, a composite fluid path comprising an intrahelical fluid path and an intratubular fluid path; and
wherein a ratio of the spring constant for radial expansion of the helical portion and the spring constant for radial expansion of the biological vessel is between 3:1 and 10:1, and/or wherein the spring constant of the helical portion is between 1,000 N/m and 10,000 N/m, and/or wherein the spring constant for radial expansion of the biological vessel is between 15,000 N/m and 30,000 N/m.

* * * * *